(12) United States Patent
Edge et al.

(10) Patent No.: US 8,792,902 B2
(45) Date of Patent: Jul. 29, 2014

(54) METHOD AND APPARATUS FOR PROVIDING LOCATION SERVICES WITH SHORT-CIRCUITED MESSAGE FLOWS

(75) Inventors: Stephen William Edge, Escondido, CA (US); Kirk Allan Burroughs, Alamo, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 11/471,049

(22) Filed: Jun. 19, 2006

(65) Prior Publication Data
US 2007/0004429 A1     Jan. 4, 2007

Related U.S. Application Data

(60) Provisional application No. 60/693,003, filed on Jun. 21, 2005, provisional application No. 60/737,339, filed on Nov. 14, 2005.

(51) Int. Cl.
     *H04W 24/00*      (2009.01)

(52) U.S. Cl.
     USPC ............... 455/456.1; 455/456.2; 455/456.3; 455/456.4; 455/456.5; 455/456.6; 455/432.1; 455/432.2; 455/432.3

(58) Field of Classification Search
     USPC .......... 455/404.2, 414.2, 432.1, 432.2, 432.3, 455/456.1–456.6
     See application file for complete search history.

(56) References Cited

U.S. PATENT DOCUMENTS

| | | | |
|---|---|---|---|
| 6,313,787 B1 | 11/2001 | King et al. |
| 6,353,743 B1 | 3/2002 | Karmel |
| 6,369,751 B1 | 4/2002 | Naruse |
| 6,453,237 B1 | 9/2002 | Fuchs et al. |
| 6,718,177 B1 | 4/2004 | Comer et al. |

(Continued)

FOREIGN PATENT DOCUMENTS

| | | |
|---|---|---|
| EP | 1617686 | 1/2006 |
| EP | 1638350 | 3/2006 |

(Continued)

OTHER PUBLICATIONS

OMA, Secure User Plane Location Architecture Nov. 21, 2005, OMA, Version 1.0, 80 pages.*

(Continued)

*Primary Examiner* — Olumide T Ajibade Akonai
(74) *Attorney, Agent, or Firm* — Arnold J. Gum

(57) ABSTRACT

A user equipment (UE) sends to a serving network a request for periodic reporting of the UE location to a client entity, periodic location information, a request to use GMLC short circuit, and/or a request to use MO-LR short circuit. Various network entities may accept or reject each of the UE requests. For each location reporting event, the UE may send to the serving network its location estimate (e.g., if available and if MO-LR short circuit is allowed) and an address of a requesting GMLC (e.g., if GMLC short circuit is allowed). The network bypasses location processing if the location estimate is selected for use. The serving network may send the location estimate directly to the R-GMLC and bypass a visiting GMLC and a home GMLC, e.g., using the address provided by the UE. The GMLC short circuit and MO-LR short circuit save system resources and shorten response time.

55 Claims, 11 Drawing Sheets

(56) References Cited

U.S. PATENT DOCUMENTS

| | | | |
|---|---|---|---|
| 6,975,941 | B1 | 12/2005 | Lau et al. |
| 7,016,693 | B2 | 3/2006 | Guyot |
| 7,054,620 | B2 | 5/2006 | Ewert et al. |
| 7,218,940 | B2 | 5/2007 | Niemenmaa et al. |
| 7,277,711 | B2* | 10/2007 | Nyu .......................... 455/456.1 |
| 7,421,277 | B2 | 9/2008 | Burroughs |
| 7,424,293 | B2 | 9/2008 | Zhu |
| 7,536,695 | B2 | 5/2009 | Alam et al. |
| 7,627,332 | B2 | 12/2009 | Shim |
| 7,706,813 | B2 | 4/2010 | Shim |
| 7,869,817 | B2 | 1/2011 | Shim |
| 7,925,276 | B2 | 4/2011 | Shim |
| 7,974,639 | B2 | 7/2011 | Burroughs et al. |
| 8,068,056 | B2 | 11/2011 | Wachter et al. |
| 2003/0225515 | A1* | 12/2003 | Havlark et al. ............... 701/213 |
| 2004/0106414 | A1 | 6/2004 | Ewert et al. |
| 2004/0137918 | A1* | 7/2004 | Varonen et al. ............ 455/456.2 |
| 2004/0192337 | A1 | 9/2004 | Hines et al. |
| 2004/0193707 | A1 | 9/2004 | Alam et al. |
| 2004/0203914 | A1* | 10/2004 | Kall et al. .................. 455/456.1 |
| 2004/0253964 | A1* | 12/2004 | Zhu ............................ 455/456.3 |
| 2005/0020276 | A1* | 1/2005 | Maanoja et al. ............ 455/456.1 |
| 2005/0043038 | A1 | 2/2005 | Maanoja et al. |
| 2005/0118999 | A1* | 6/2005 | Zhu ............................ 455/432.1 |
| 2005/0125493 | A1 | 6/2005 | Chaskar et al. |
| 2005/0136942 | A1 | 6/2005 | Timiri et al. |
| 2005/0148340 | A1* | 7/2005 | Guyot ......................... 455/456.2 |
| 2005/0153706 | A1 | 7/2005 | Niemenmaa et al. |
| 2005/0239480 | A1 | 10/2005 | Kim et al. |
| 2006/0036680 | A1 | 2/2006 | Shim |
| 2006/0099958 | A1* | 5/2006 | Gustafsson et al. ........ 455/456.1 |
| 2006/0099960 | A1 | 5/2006 | Duan |
| 2006/0099961 | A1 | 5/2006 | Duan |
| 2006/0135174 | A1* | 6/2006 | Kraufvelin et al. ......... 455/456.1 |
| 2006/0258371 | A1 | 11/2006 | Krishnamurthi et al. |
| 2006/0293066 | A1 | 12/2006 | Edge et al. |
| 2007/0026871 | A1 | 2/2007 | Wager |
| 2007/0054675 | A1 | 3/2007 | Duan |
| 2007/0054676 | A1* | 3/2007 | Duan et al. .................. 455/456.2 |
| 2007/0173253 | A1* | 7/2007 | Duan et al. ..................... 455/433 |
| 2008/0139218 | A1 | 6/2008 | Duan |
| 2010/0173607 | A1 | 7/2010 | Thornton et al. |
| 2011/0319095 | A1 | 12/2011 | Burroughs et al. |
| 2012/0264448 | A1 | 10/2012 | Wachter et al. |
| 2013/0210451 | A1 | 8/2013 | Edge et al. |

FOREIGN PATENT DOCUMENTS

| | | |
|---|---|---|
| EP | 1686814 | 8/2006 |
| JP | 2001346264 A | 12/2001 |
| JP | 2004061187 | 2/2004 |
| JP | 2006526338 | 11/2006 |
| JP | 2007511967 | 5/2007 |
| JP | 2007534180 | 11/2007 |
| KR | 20030015577 | 2/2003 |
| RU | 2002121494 | 3/2004 |
| WO | WO9711384 A1 | 3/1997 |
| WO | 03045101 | 5/2003 |
| WO | WO03061322 A1 | 7/2003 |
| WO | 2004112410 | 12/2004 |
| WO | 2004114688 | 12/2004 |
| WO | WO2004114689 | 12/2004 |
| WO | 2005051009 | 6/2005 |
| WO | WO2005069670 A1 | 7/2005 |

OTHER PUBLICATIONS

Secure User Plane Location Architecture, Nov. 1, 2004, OMA, Draft Version 1.0, 57 pages.*
Duan, A Disposal Method of Location Information Request in the Location Service, Jan. 13, 2005, Wipo, 1 page.*
3GPP TS 23.032 V6.0.0 (Dec. 2004), 3rd Generation Partnership Project; Technical Specification Group Core Network; Universal Geographical Area Description (GAD) (Release 6).
3GPP TS 23.171 v3.11.0; "3rd Generation Partnership Project; Technical Specification Group Services and System Aspects; Functional stage 2 description of location services in UMTS," 3GPP TS 23.171 version 3.11.0 Release 1999 (Mar. 2004).
3GPP TS 23.271 v6.10.0; "3rd Generation Partnership Project; Technical Specification Group Services and System Aspects; Functional stage 2 description of Location Services (LCS)," 3GPP TS 23.271 version 6.10.0 Release 6 (Dec. 2004).
3GPP TS 23.271 v7.1.0; "3rd Generation Partnership Project; Technical Specification Group Services and System Aspects; Functional stage 2 description of Location Services (LCS)," 3GPP TS 23.271 version 7.1.0 Release 7 (Jun. 2005).
3GPP TS 24.080 v6.3.0; "3rd Generation Partnership Project; Technical Specification Group Core Network; Mobile radio interface layer 3 supplementary services specification; Formats and coding," 3GPP TS 24.080 version 6.3.0 Release 6 (Mar. 2005).
3GPP TS 25.305 v6.1.0; "3rd Generation Partnership Project; Technical Specification Group Radio Access Network; Stage 2 functional specification of User Equipment (UE) positioning in UTRAN," 3GPP TS 25.305 version 6.1.0 Release 6 (Jun. 2004).
3GPP TS 25.453 v6.9.0; "3rd Generation Partnership Project; Technical Specification Group Radio Access Network; UTRAN Iupc interface Positioning Calculation Application Part (PCAP) signalling," 3GPP TS 25.453 version 6.9.0 Release 6 (Jun. 2005).
3GPP TS 43.059 V6.1.0 (Jun. 2003); 3rd Generation Partnership Project; Technical Specification Group GSM/EDGE Radio Access Network; Functional stage 2 description of Location Services (LCS) in Geran (Release 6).
3GPP TS 43.059 v7.0.0; "3rd Generation Partnership Project; Technical Specification Group GSM/EDGE Radio Access Network; Functional stage 2 description of Location Services (LCS) in GERAN," 3GPP TS 43.059 versioni 7.0.0 Release 7 (Apr. 2005).
3GPP2 X.S0002 v1.0.0; "TIA/EIA-41-D Location Services Enhancements," IS-881,3GPP2 X.S0002 version 1.0.0 Revision 0 (Mar. 2004).
3GPP2 X.S0024 v1.0; "IP-Based Location Services," 3GPP2 X.S0024 version 1.0 Revision 0 (Oct. 2005).
ETSI TS 123 271 v6.11.0; "Digital Cellular Telecommunications System (Phase 2+); Universal Mobile Telecommunications System (UMTS); Functional stage 2 description of Location Services (LCS)," XP014027546, 3GPP TS 23.271 version 6.11.0 Release 6 (Mar. 2005).
OMA-AD-SUPL-V1_0-20050719-C: "Secure User Place Location Architecture." Open Mobile Alliance. Candidate Version 1.0, XP002410620, Jul. 19, 2005.
OMA-AD-SUPL-V2_0-20060619-D; "Secure User Plane Location Architecture," Open Mobile Alliance, Draft Version 4.0, Jun. 19, 2006.
OMA-TS-ULP-V1_0-20060704-C: "User Plane Location Protocol," Open Mobile Alliance, Candidate Version 1.0, Jan. 22, 2007.
OMA-TS-ULP-V2_0-20060727-D; "UserPlane Location Protocol," Open Mobile Alliance, Draft Version 2.0, Jul. 27, 2006.
Qualcomm Incorporated: "S2-051535: Efficient Support of Periodic Location," 3GPP TSG SA WG2 S2#47, [Online] Jun. 27, 2005-Jul. 1, 2005, pp. 1-14, XP002405914, Montreal, Canada.
Qualcomm, "S2-051536: CR: 23.271: Addition of Periodic Location Procedures," 3GPP TSG-SA WG2 Meeting #47, Jul. 1, 2005, pp. 1-26, XP-002410621, Montreal, Canada.
TIA-801-A; "Position Determination Service for cdma2000 Spread Spectrum Systems," Revision of TIA-801-A, Telecommunications Industry Association, Apr. 2004.
International Search Report-PCT/US2006/024374, International Search Authority-European Patent Office-Nov. 22, 2006.
Written Opinion-PCT/US2006/024374, International Search Authority-European Patent Office-Nov. 22, 2006.
International Preliminary Report on Patentability-PCT/US2006/024374, International Bureau of WIPO-Geneva, Switzerland-Dec. 24, 2007.
Defendant *Qualcomm Incorporated, Snaptrack, Inc.* and *Norman Krasner's* Answer to Fourth Amended Complaint, Case 3:08-cv-c01992-MMA-POR, Document 54, pp. 1-26, Jan. 21, 2010.

(56) References Cited

OTHER PUBLICATIONS

ETSI TS 125.305 v 6.1.0: "Universal Mobile Telecommunications Systems (UMTS)," European Telecommunications Standard Institute, France, (Jun. 1, 2004), XP014016761.

"Order Rescheduling Early Neutral Evaluation," United States District Court Civil Case No. 3:08-cv-01992-MMA-POR, Document 57, p. 1; Mar. 1, 2010.

"Plaintiffs' First Amended Complaint," United States District Court Case:3.08-cv-01992-MMA-POR, Document 14, pp. 1-39. Apr. 29, 2009.

"Plaintiffs' Fourth Amended Complaint," United States District Court Case:3:08-cv-01992-MMA-POR, Document 53, pp. 1-33, Jan. 11, 2010.

"Plaintiffs' First Amended Complaint," United States District Court Case:3:08-cv-01992-BEN-NLS, pp. 1-34, Oct. 24, 2008.

"Plaintiffs' Second Amended Complaint," United States District Court Case:3:08-cv-01992-MMA-POR, Document 36, pp. 1-40, Sep. 14, 2009.

"Plaintiffs' Third Amended Complaint," United States District Court Case:3:08-cv-01992-MMA-POR, Document 40, pp. 1-35, Oct. 9, 2009.

Secure User Plane Location Architecture, Candidate Version 1.0—Jul. 19, 2005, Open Mobile Alliance OMA-AD-SUPL-V1_0-20050719-C. Jul. 2005, pp. 1-80.

Wang J., et al., "OMA-LOC-2004-136R03-CR_SUPL_AD_Message_Periodic Call Flows", Jun. 2004, URL, http://member.openmobilealliance.org/ftp/Public documents/LOC/2004/OMA-LOC-2004-0136R03-SUPL_Periodic_Call_Flows.zip.

* cited by examiner

METHOD AND APPARATUS FOR PROVIDING LOCATION SERVICES WITH SHORT-CIRCUITED MESSAGE FLOWS

The present application claims priority to provisional U.S. application Ser. No. 60/693,003, entitled "Method and Apparatus for Providing Location Services with Short-Circuited Message Flows," filed Jun. 21, 2005, assigned to the assignee hereof and incorporated herein by reference. The present application claims priority to provisional U.S. Application Ser. No. 60/737,339, entitled "Method and Apparatus for Providing Location Services with Short-Circuited Message Flows," filed Nov. 14, 2005, assigned to the assignee hereof and incorporated herein by reference.

BACKGROUND

1. Field

The present invention relates generally to communication, and more specifically to techniques for providing location services.

2. Background

It is often desirable, and sometimes necessary, to know the location of a wireless device in a network. For example, a wireless user may utilize the wireless device to browse through a website and may click on location sensitive content. The web server may then query the network for the location of the wireless device. The network may initiate location processing with the wireless device in order to ascertain the location of the wireless device. The network would then return a location estimate for the wireless device to the web server, which may use this location estimate to provide appropriate content to the wireless user. There are many other scenarios in which knowledge of the location of the wireless device is useful or necessary. In the following description, the terms "location" and "position" are synonymous and are used interchangeably.

A message flow (which may also be called a call flow or a procedure) is typically executed in order to obtain a location estimate for the wireless device and to send this location estimate to a client entity (e.g., the web server). Various messages are typically exchanged between one or more network entities, the wireless device, and the client entity for the message flow. These messages ensure that each entity is provided with pertinent information, or can obtain this information from another entity, in order to carry out positioning for the wireless device and/or to deliver the location estimate to the client entity. However, these messages add to the traffic among the various network entities. The additional traffic may be much greater for periodic location reporting, which periodically provides a location estimate for the wireless device to the client entity. The messages may also extend the response time for sending the location estimate to the client entity, possibly by an unacceptable amount.

There is therefore a need in the art for techniques to efficiently provide location services.

SUMMARY

Techniques for efficiently providing location services (LCS) with short-circuited message flows are described herein. These techniques may be used for mobile terminated location request (MT-LR) as well as mobile originated location request (MO-LR). These techniques may also be used for (1) one-shot location reporting which provides a single location estimate for a wireless device and (2) periodic location reporting which provides multiple location estimates for the wireless device based on periodic location information. This periodic location information may indicate a schedule of reporting events and/or a set of predetermined events that trigger location reporting. The techniques may also be used for various networks (e.g., UMTS, GSM, and CDMA networks) and various location architectures (e.g., control plane and user plane).

In an embodiment for periodic location reporting, a wireless device (which is also called a user equipment (UE)) sends to a visited/serving network a request for periodic reporting of the UE location to a client entity (e.g., an LCS client) and periodic location information. The UE may also send a request to use GMLC short circuit and/or a request to use MO-LR short circuit. GLMC short circuit refers to the exchange of messages directly between a requesting gateway mobile location center (R-GMLC) and the visited network, thereby bypassing a visited GMLC (V-GMLC) associated with the visited network and a home GMLC (H-GMLC) associated with a home network for the UE. MO-LR short circuit refers to the bypass of location processing between the visited network and the UE to obtain a location estimate for the UE. In an embodiment, each UE request may be accepted or rejected by various network entities.

Thereafter, for each location reporting event determined by the periodic location information, the UE may send its location estimate to the visited network, e.g., if this location estimate is available at the UE and if MO-LR short circuit is allowed. The UE may also send an address of the R-GMLC to the visited network, e.g., if GMLC short circuit is allowed. The UE may perform location processing with the visited network if (1) a location estimate was not sent by the UE or (2) a location estimate was sent by the UE but the visited network decides not to use this location estimate. The network may bypass the location processing if a location estimate is sent by the UE and is selected for use. Regardless of how the location estimate is obtained, the visited network may send the location estimate for the UE directly to the R-GMLC and bypass the V-GMLC and H-GMLC, e.g., using the R-GMLC address provided by the UE. The GMLC short circuit and MO-LR short circuit save system resources and shorten the response time to provide the location estimate to the LCS client.

Various MO-LR and MT-LR message flows for one-shot location reporting and periodic location reporting are described below. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The location reporting techniques described herein may be used for various wireless networks such as a Code Division Multiple Access (CDMA) network, a Time Division Multiple Access (TDMA) network, a Frequency Division Multiple Access (FDMA) network, an Orthogonal Frequency Division Multiple Access (OFDMA) network, a network supporting a combination of the aforementioned technologies, a network with wide area network (WAN) coverage as well as wireless local area network (WLAN) coverage, and so on. A CDMA network may implement one or more CDMA radio access technologies (RATs) such as Wideband CDMA (W-CDMA), cdma2000, and so on. cdma2000 covers IS-2000, IS-856, and IS-95 standards. A TDMA network may implement one or more TDMA RATs such as Global System for Mobile Communications (GSM), Digital Advanced Mobile Phone System (D-AMPS), and so on. D-AMPS covers IS-136 and IS-54. These various RATs and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, the techniques are described below for 3GPP-based networks that utilize one or more RATs and one or more networking protocols promulgated by 3GPP. For example, a 3GPP-based network may be (1) a Universal Mobile Telecommunication System (UMTS) network that utilizes W-CDMA as the RAT for over-the-air communication and Mobile Application Part (MAP) as the networking protocol for core network functionality or (2) a GSM network that utilizes GSM for over-the-air communication and MAP for core network functionality.

Figure 1:
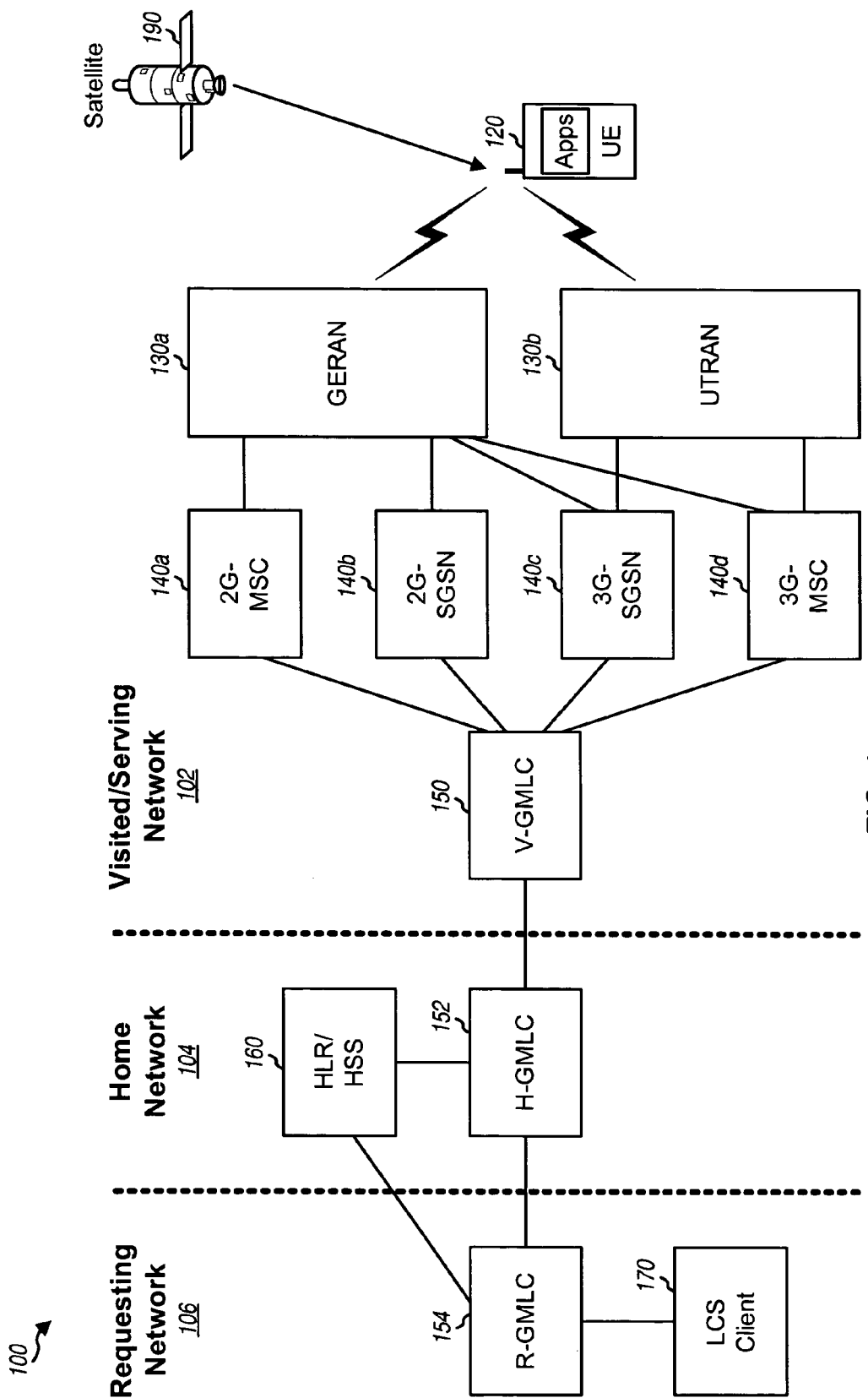
FIG. 1 shows a visited network, a home network, and a requesting network.

FIG. 1 shows a 3GPP-based deployment 100 that includes a visited/serving network 102, a home network 104, and a requesting network 106. Visited network 102 is a network that is currently serving a wireless device 120, which is called UE 120 (3GPP terminology) in the following description. Home network 104 is a network with which UE 120 has a subscription. Requesting network 106 is a network via which an LCS client 170 may originate a request for the location of UE 120. Home network 104 may be the same as or different from visited network 102 and may be the same as or different from requesting network 106. Requesting network 106 may be the same as or different from visited network 102. Wireless device 120 may be roaming and may communicate with different visited networks. Each network may be referred to as a public land mobile network (PLMN).

For the embodiment shown in FIG. 1, visited network 102 includes a second generation (2G) GSM EDGE Radio Access Network (GERAN) 130a and a third generation (3G) Universal Terrestrial Radio Access Network (UTRAN) 130b. Each Radio Access Network (RAN) 130 provides wireless communication for UEs located throughout the coverage area of the RAN. For simplicity, only one UE 120 is shown in FIG. 1.

GERAN 130a communicates with a 2G mobile services switching center (2G-MSC) 140a and/or a 2G serving GPRS support node (2G-SGSN) 140b. UTRAN 130b communicates with a 3G-SGSN 140c and/or a 3G-MSC 140d. Each MSC performs switching functions for circuit-switched calls (e.g., setup, routing, and eventual release of circuit-switched voice and data calls) for UEs within its coverage area. Each MSC may act as a visited MSC (VMSC) and may be an MSC server. Each SGSN performs switching and routing functions for packet-switched calls and packet-switched connections. A gateway mobile location center (GMLC) performs various functions to support location services, interfaces with external LCS clients, and provides services such as subscriber privacy, authorization, authentication, billing, and so on. In a roaming scenario, these functions may be divided between R-GMLC 154, H-MLC 152 and V-GMLC 150. V-GLMC 150 communicates with MSCs 140a and 140d and SGSNs 140b and 140c. Although not shown in FIG. 1 for simplicity, a serving mobile location center (SMLC) provides positioning services and may support UE-based, UE-assisted, and network-based positioning modes. The SMLC may communicate with GERAN 130a, UTRAN 130b, 2G-MSC 140a, and so on. The SLMC may in some cases be a physical and/or logical part of the MSC/SGSN or RAN.

Home network 104 includes a home GMLC (H-GMLC) 152 and a home location register (HLR)/home subscriber server (HSS) 160. H-GMLC 152 supports location services for home network 104. HLR/HSS 160 stores registration information for UEs (e.g., UE 120) that are subscribers of home network 104. Requesting network 106 includes a requesting GLMC (R-GLMC) 154 that supports location services for requesting network 106. Although not shown in FIG. 1, R-GLMC 154 and/or H-GLMC 152 may communicate directly with MSC 140a, SGSN 140b, SGSN 140c, and/or MSC 140d in visited network 102 via appropriate interfaces.

An LCS client 170 is a function or an entity that requests location information for LCS targets. An LCS target is a UE whose location is being sought. In general, an LCS client may reside in a network entity or a UE or may be external to both the network and the UE. LCS client 170 communicates with R-GLMC 154.

For simplicity, FIG. 1 shows network entities that are pertinent for location services. These network entities are described in 3GPP TS 23.271, entitled "Functional stage 2 description of Location Services (LCS) (Release 6)," in 3GPP TS 25.305, entitled "Stage 2 functional specification of User Equipment (UE) positioning in UTRAN (Release 6)," and in 3GPP TS 43.059, entitled "Functional stage 2 description of Location Services (LCS) in GERAN (Release 6)," all of which are publicly available.

Networks 102, 104, and 106 in FIG. 1 utilize a control plane to support location services. A control plane (which is also commonly called a signaling plane) is a mechanism for carrying signaling for higher-layer applications and may be implemented with network-specific protocols and signaling messages. A user plane is a mechanism for carrying data for higher-layer applications and employs a user-plane bearer, which is typically implemented with protocols such as User Datagram Protocol (UDP), Transmission Control Protocol (TCP), and Internet Protocol (IP), all of which are well known in the art. Messages supporting location services and positioning are carried as part of signaling in a control plane architecture and as part of data in a user plane architecture. The content of the messages may, however, be similar or even identical in both architectures.

The network entities in FIG. 1 may also be referred to by other names in other networks and other location architectures. For example, in a Secure User Plane Location (SUPL) architecture promulgated by Open Mobile Alliance (OMA), a GLMC is called a SUPL location center (SLC), a UE that supports SUPL is called a SUPL enabled terminal (SET), and an SMLC is called a SUPL positioning center (SPC). A GLMC may also be called a location center, an LCS server, a location server, a mobile positioning center (MPC), and so on. V-GMLC 150, R-GMLC 154, and H-GMLC 152 may generically be referred to as first, second, and third location centers, respectively, that are associated with different networks. In general, each network may include any collection of network entities that can provide any range of services.

UE 120 may be fixed or mobile and may also be called a mobile station, a terminal, a subscriber unit, or some other terminology. UE 120 may also be a cellular phone, a laptop, a personal digital assistant (PDA), a telemetry device, a tracking device, and so on. UE 120 may communicate with one or more base stations in GERAN 130a and/or one or more base stations in UTRAN 130b. UE 120 may also receive signals from one or more satellites 190, which may be part of the Global Positioning System (GPS), the European GALILEO system, or the Russian Glonass system. UE 120 may measure signals from base stations in GERAN 130a and/or UTRAN 130b and/or signals from satellites 190 and may obtain pseudo-range measurements for these base stations and satellites. These measurements may be used to compute a location estimate for the UE.

A location estimate for UE 120 may be obtained using a UE-based, UE-assisted, or network-based positioning mode. Positioning refers to a functionality that detects or determines a geographical location of a target UE. For the UE-based mode, the location of the UE is determined by the UE, possibly with assistance data from an SMLC. For the UE-assisted mode, the location of the UE is determined by the SMLC with assistance (e.g., measurements) from the UE. For the network-based mode, the location of the UE is determined based on information obtained by or already known to the serving network without any special assistance from the UE.

The UE-based and UE-assisted modes may utilize various positioning methods such as GPS, assisted GPS (A-GPS), hybrid, advanced forward link trilateration (A-FLT), enhanced observed time difference (E-OTD), observed time difference of arrival (OTDOA), and so on. The network-based mode may utilize various positioning methods such as uplink time of arrival (U-TOA), uplink time difference of arrival (U-TDOA), cell-ID, enhanced cell-ID, and so on. Multiple positioning methods for one or more positioning modes may also be employed in combination. The GPS and A-GPS methods derive a location estimate for the UE based solely on satellite measurements and have high accuracy. The hybrid method derives a location estimate based on both satellite and base station measurements and has high accuracy and high reliability. The A-FLT, E-OTD, and OTDOA methods derive a location estimate based on measurements of base station timing made by the UE and have more intermediate accuracy. The U-TOA and U-TDOA methods derive a location estimate based on measurements of UE timing made by the serving network and have more intermediate accuracy. The cell-ID and enhanced cell-ID methods derive a location estimate based on a cellular network and have coarser accuracy. These various positioning methods are known in the art.

The location of UE 120 may be requested by (1) applications running at LCS client 170, which results in mobile terminated location request (MT-LR), and (2) applications (Apps) running at the UE, which results in mobile originated location request (MO-LR). The location of UE 120 may be requested one time, which results in immediate location reporting, or multiple times with a single request, which results in periodic location reporting. Periodic location reporting may be achieved with a periodic MT-LR message flow or a periodic MO-LR message flow. Each location reporting within the periodic location reporting may be achieved with a one-shot MO-LR message flow or a one-shot MT-LR message flow. Periodic location reporting provides a location estimate for the target UE to the LCS client periodically based on periodic location information that indicates when to report the location of UE to the client entity. The periodic location information may be a schedule of reporting events and/or a set of triggering events. The schedule may be given in various formats such as, e.g., a start time, a reporting interval, and one of a stop time, a duration, or a particular number of reports. The triggering events may correspond to, e.g., the UE becoming available, the UE entering or leaving predefined geographic areas, the UE being within the predefined geographic areas, the UE velocity or acceleration exceeding predefined thresholds, the UE location, velocity or acceleration changing by predefined thresholds, and so on.

GLMC short circuit and/or MO-LR short circuit may be used for various message flows. GLMC short circuit refers to the exchange of messages directly between R-GMLC 154 and MSC/SGSN 140, thereby bypassing or short circuiting V-GMLC 150 and H-GMLC 152. MO-LR short circuit refers to the bypass of location processing for a one-shot MO-LR message flow or a one-shot MT-LR message flow. The location processing may be short circuited, for example, if a suitable location estimate is provided by the UE and MO-LR short circuit is allowed. GMLC short circuit, MO-LR short circuit, or both types of short circuit may be used to save system resources and to provide a faster response for a location request.

Figure 2:
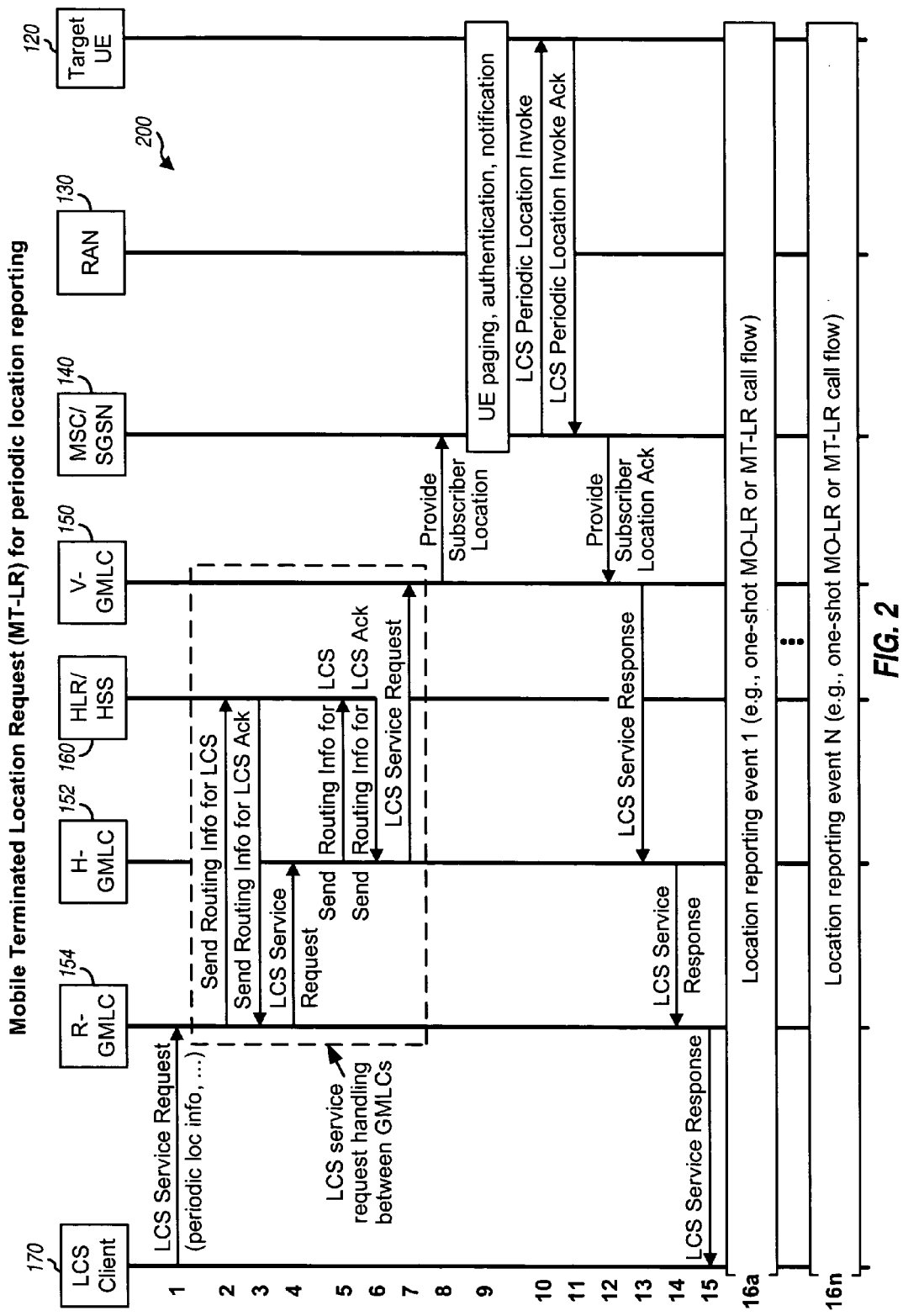
FIG. 2 shows a message flow for MT-LR periodic location reporting.

FIG. 2 shows a message flow 200 for MT-LR periodic location reporting in which periodic location of target UE 120 is requested by LCS Client 170 external to the wireless networks. For message flow 200, LCS client 170 sends to R-GMLC 154 an LCS Service Request message that contains (1) a request for periodic location reporting of UE 120 to LCS client 170 (i.e., a periodic location request) and (2) periodic location information ("periodic loc info") (step 1). R-GMLC 154 verifies the identity of LCS client 170, authenticates the LCS client, and determines whether the LCS client is authorized for the requested location service. If LCS client 170 is authorized, then R-GMLC 154 determines an identifier of UE 120 and LCS quality of service (QoS) from subscription data for the LCS client, subscription data for the subscriber of UE 120, and/or data supplied by the LCS client. R-GMLC 154 then sends to HLR/HSS 160 a Send Routing Info for LCS message that contains the identifier of UE 120 (step 2). HLR/HSS 160 verifies whether R-GMLC 154 is authorized to request location information for UE 120 and returns to R-GMLC 154 a Send Routing Info for LCS Acknowledgment message that contains the address of H-GMLC 152 (step 3). If R-GMLC 154 is the H-GMLC, then steps 4, 5, 6 and 14 of message flow 200 are skipped. Otherwise, R-GMLC 154 sends to H-GMLC 152 an LCS Service Request message that contains the periodic location request and other relevant information (step 4).

H-GMLC 152 verifies whether R-GMLC 154 is authorized to request location information for UE 120 and, if yes, performs a privacy check based on a privacy profile for the UE subscriber (also step 4). For the privacy check, H-GMLC 152 verifies if LCS client 170 or this type of LCS client is allowed to request periodic location for UE 120 and whether the UE may need to be notified of this request and allowed to accept or reject the request. H-GMLC 152 also assigns a reference ID that is used to associate subsequent location reports with the original periodic location request, if the request is accepted. If H-GMLC 152 does not know the current serving MSC or SGSN of UE 120 and the associated V-GMLC, then H-GMLC 152 sends a Send Routing Info for LCS message to HLR/HSS 160 to request routing information for the UE (step 5). HLR/HSS 160 then returns a Send Routing Info for LCS Acknowledgment message that contains the address of V-GMLC 150 and the address of MSC/SGSN 140 (step 6). Steps 5 and 6 may be skipped if H-GMLC 152 already knows the address of V-GMLC 150. H-GMLC 152 then sends to V-GMLC 150 an LCS Service Request message that contains the periodic location request and other relevant information (step 7). V-GMLC 150 authenticates that the periodic location request from H-GMLC 152 is allowed (also step 7). V-GMLC 150 typically receives the address of MSC/SGSN 140 from H-GMLC 152 but may query HLR/HSS 160 for the MSC/SGSN address if this address is not received from H-GMLC 152. V-GMLC 150 then sends to MSC/SGSN 140 a Provide Subscriber Location message that contains the periodic location request, the UE identifier, the LCS QoS, and/or other relevant information (step 8).

In an embodiment, the LCS Service Request message sent by R-GMLC 154 in step 4, the LCS Service Request message sent by H-GMLC 152 in step 7, and the Provide Subscriber Location message sent by V-GMLC 150 in step 8 may each contain (1) the address of R-GMLC 154, if GMLC short circuit is preferred, and (2) an indication as to whether MO-LR short circuit is allowed or preferred. In an embodiment, R-GMLC 154, H-GMLC 152, V-GMLC 150, and MSC/SGSN 140 may each accept or reject the use of GMLC short circuit and may each accept or reject the use of MO-LR short circuit.

MSC/SGSN 140 may authenticate that the periodic location request is allowed (also step 8). If the periodic location request is allowed, then MSC/SGSN 140 may invoke RAN 130 to perform paging and authentication of UE 120 (step 9). If notification or privacy verification is needed, then UE 120 notifies the wireless user of the periodic location request, queries the user to grant or deny permission, and sends back the privacy verification result indicating whether permission is granted or denied (also step 9). UE 120 may provide its LCS capabilities to RAN 130 and/or MSC/SGSN 140, e.g., whether the UE-based and/or UE-assisted modes are supported by the UE (also step 9). MSC/SGSN 140 then sends to UE 120 an LCS Periodic Location Invoke message that contains pertinent information for the periodic location request (e.g., the periodic location information, the LCS QoS, the R-GMLC address, the H-GMLC address, the reference ID, an indication to use MO-LR short circuit, and so on) (step 10). The LCS Periodic Location Invoke message may also include (1) a list of PLMNs in which subsequent periodic location reporting is allowed (e.g., MO-LR requests may be originated) and (2) an indication for each PLMN as to whether the PLMN supports periodic location in the RAN. If no list of PLMNs is included, then subsequent MO-LR requests may be restricted to the current serving PLMN.

UE 120 then sends to MSC/SGSN 140 an LCS Periodic Location Invoke Acknowledgment message that indicates whether or not the periodic location request is accepted (step 11). If the periodic location request is not accepted but any privacy verification passes, UE 120 would be indicating a willingness to allow periodic location but an inability or unwillingness to directly support it. In that case, MSC/SGSN 140 may still invoke periodic location via RAN 130, if supported. Otherwise, an error response is originated by MSC/SGSN 140 and returned to LCS client 170. In any case, MSC/SGSN 140 sends to V-GMLC 150 a Provide Subscriber Location Acknowledgment message that contains relevant information such as whether the periodic location request is accepted, whether GMLC short circuit will be used, and whether MO-LR short circuit will be used (step 12). This message may also convey the list of PLMNs sent to UE 120 in step 10. V-GMLC 150 then sends an LCS Service Response message that contains pertinent information to H-GMLC 152 (step 13). H-GMLC 152 may perform additional privacy check if needed (also step 13) and sends an LCS Service Response message to R-GMLC 154 (step 14). R-GMLC 154 then sends an LCS Service Response message containing relevant information (e.g., whether the periodic location request is accepted) to LCS client (step 15). Periodic location reporting is then performed as indicated by the periodic location information (steps 16a through 16n).

Figure 3:
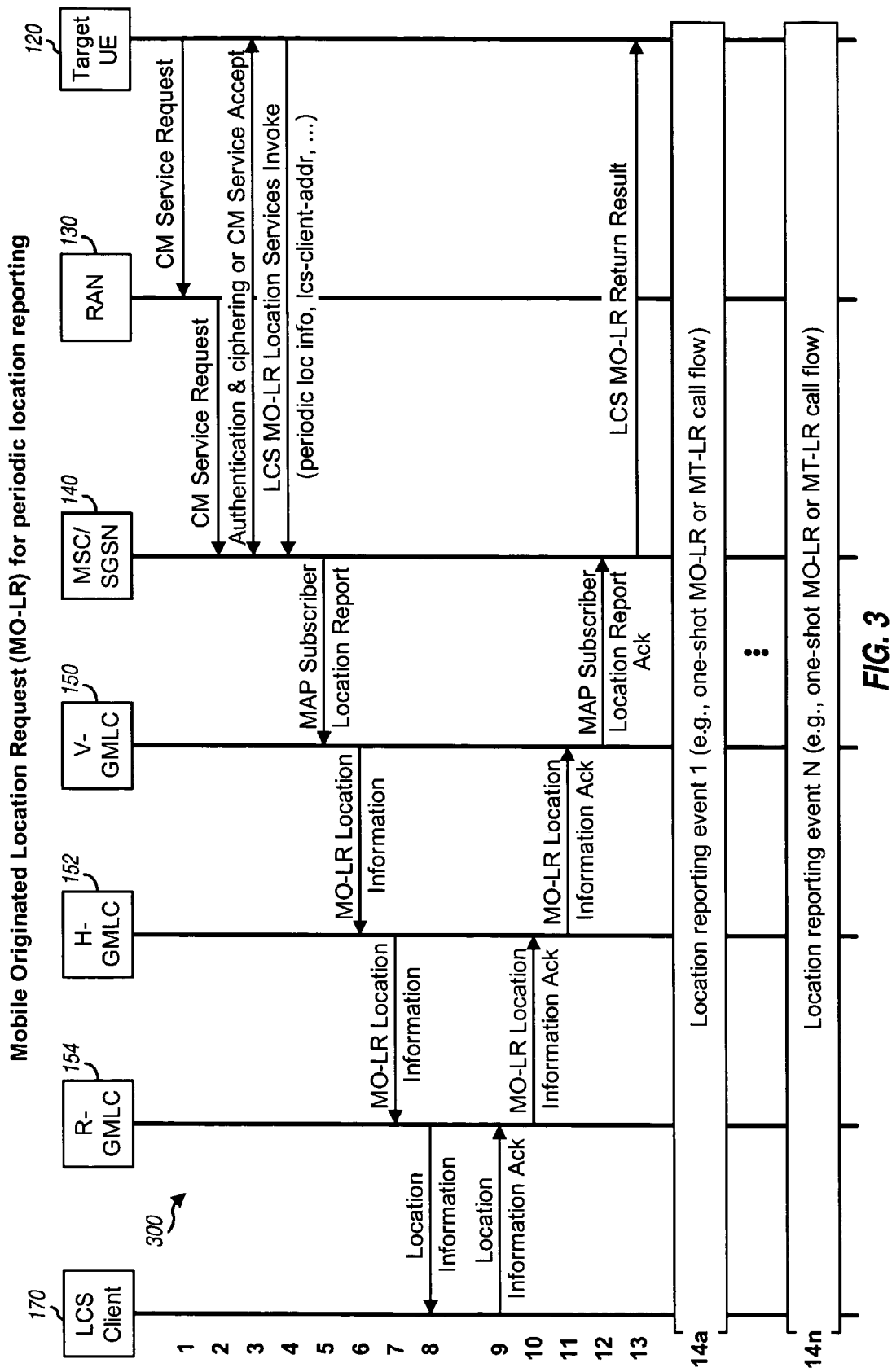
FIG. 3 shows a message flow for MO-LR periodic location reporting.

FIG. 3 shows a message flow 300 for MO-LR for periodic location reporting in which periodic location of target UE 120 is requested by UE 120 on behalf of LCS Client 170 external to the wireless networks. If UE 120 is in an idle mode, then the UE requests a radio connection setup and sends to RAN 130 a Connection Management (CM) Service Request message indicating a request for a call independent supplementary service (step 1). If UE 120 is in a dedicated mode, then the UE sends a CM Service Request on the already established radio connection (also step 1). RAN 130 forwards the CM Service Request message to MSC/SGSN 140 (step 2). MSC/SGSN 140 instigates authentication and ciphering if UE 120 was in the idle mode or returns a Direct Transfer CM Service Accept message if UE 120 was in the dedicated mode (step 3). UE 120 may provide its LCS capabilities to RAN 130 and/or MSC/SGSN 140, e.g., whether the UE-based and/or UE-assisted modes are supported by the UE (also step 3). For clarity, steps 1 through 3 are for a circuit switched (CS) domain connection setup in which signaling is sent to the MSC. Steps 1 through 3 would be different for a packet switched (PS) domain connection setup.

UE 120 then sends to MSC/SGSN 140 an LCS MO-LR Location Services Invoke message that contains (1) a request for periodic location reporting of UE 120 to LCS client 170 (i.e., a periodic location request) and (2) pertinent information for the periodic location reporting (step 4). The pertinent information may include any combination of the following:
 1. a schedule for location reporting ("periodic loc info");
 2. specific events used to trigger location reporting to LCS client 170 (also "periodic loc info");
 3. the identity of LCS client 170 ("lcs-client-addr");
 4. the identity of R-GMLC 154 through which LCS client 170 can be accessed;
 5. the LCS QoS, e.g., accuracy and response time;
 6. a preferred method for periodic location reporting, e.g., MT-LR or MO-LR;
 7. the maximum allowed age of any location estimate;
 8. whether UE 120 should be identified to LCS client 170 using the real identity or real address of the UE or using a pseudonym; and
 9. other relevant information.

In an embodiment, UE 120 may request for permission to use GMLC short circuit and/or MO-LR short circuit for subsequent location reporting events. For this embodiment, UE 120 may include (1) a request for permission to use GMLC short circuit and/or (2) a request for permission to use MO-LR short circuit (e.g., if UE 120 supports the UE-based mode) in the LCS MO-LR Location Services Invoke message sent to MSC/SGSN 140 in step 4. In an embodiment, any entity among MSC/SGSN 140, V-GMLC 150, H-GMLC 152, R-GMLC 154, and LCS client 170 may accept or reject the UE request for each type of short circuit. In another embodiment, MSC/SGSN 140 may request to use GMLC short circuit and/or MO-LR short circuit, e.g., if UE 120 does not request GMLC short circuit and/or MO-LR short circuit or if UE 120 is not permitted to make these requests. Any entity among V-GMLC 150, H-GMLC 152, R-GMLC 154, and LCS client 170 may then accept or reject the MSC/SGSN request for each type of short circuit. In yet another embodiment, MSC/SGSN 140 may indicate a willingness or a capability to support GMLC short circuit and/or MO-LR short circuit without specifically requesting to use these short circuits. Any entity among V-GMLC 150, H-GMLC 152, R-GMLC 154, and LCS client 170 may then accept or reject the willingness or capability to support each type of short circuit. One entity (e.g., H-GMLC 152) may decide whether to use each type of short circuit if all entities indicate willingness and capability for that short circuit. In any case, the use of MO-LR short circuit may be controlled for various reasons such as, e.g., to deal with a lack of trust in either the UE accuracy and reliability or the UE integrity (e.g. spoofing), for billing and subscription issues, and so on. For example, the use of MO-LR short circuit may be allowed if UE 120 is trusted to provide location estimates directly to MSC/SGSN 140 without verification by RAN 130. The use of GLMC short circuit may also be controlled for reasons relating to billing, subscription, privacy, security, and so on. The request to use GMLC short circuit and the request to use MO-LR short circuit may be treated as independent requests. In yet another embodiment, any entity among UE 120, MSC/SGSN 140, V-GMLC 150, H-GMLC 152 and R-GMLC 154 can autonomously decide whether or not to use GLMC short circuit and whether or not to use MO-LR short circuit.

MSC/SGSN 140 verifies that UE 120 is authorized for the requested location service based on a subscription profile for the UE (also step 4). If the periodic location request is authorized, then MSC/SGSN 140 sends to V-GMLC 150 a MAP Subscriber Location Report message that contains the periodic location request and the pertinent information (e.g., the periodic location information, the request to use GMLC short circuit, the request to use MO-LR short circuit, and so on) (step 5). V-GMLC 150 then sends an MO-LR Location Information message that contains the periodic location request and the pertinent information to H-GMLC 152 (step 6), which forwards the message to R-GMLC 154 (step 7), which further forwards the periodic location request and the pertinent information to LCS client 170 (step 8).

In an embodiment, any entity among MSC/SGSN 140, V-GMLC 150, H-GMLC 152, R-GMLC 152, and LCS client 170 can refuse or accept the periodic location request. If this request is accepted (e.g., not refused by any entity), then H-GMLC 152 assigns a reference ID for the periodic location request. In an embodiment, if the periodic location request is accepted, then any entity can reject the request to use GMLC short circuit (if sent) and any entity can reject the request to use MO-LR short circuit (if sent).

LCS client 170 sends a response for the UE request(s) to R-GMLC 154 (step 9), which sends its response in an MO-LR Location Information Acknowledgment message to H-GMLC 152 (step 10). H-GMLC 152 sends its response in an MO-LR Location Information Acknowledgment message to V-GMLC 150 (step 11), which sends its response in a MAP Subscriber Location Report Acknowledgment message to MSC/SGSN 140 (step 12). The response sent by each entity incorporates the response received from the preceding entity (if any) and indicates acceptance or rejection of the periodic location request. If the periodic location request is accepted, then the response sent by each entity further indicates acceptance or rejection of the GMLC short circuit request (if sent) and acceptance or rejection of the MO-LR short circuit request (if sent). MSC/SGSN 140 may receive any combination of the following information:

1. the reference ID assigned by H-GMLC 152;
2. a modified schedule for location reporting ("periodic loc info");
3. modified specific events used to trigger location reporting to LCS client 170 (also "periodic loc info");
4. an MO-LR short circuit indication that indicates if UE 120 is allowed or expected to provide location estimates directly to MSC/SGSN 140 without verification in RAN 130;
5. a GMLC short circuit indication that indicates if location estimates can or will be sent directly to R-GMLC 154;
6. an address of H-GMLC 152 used to send location information to H-GMLC 152;
7. an address of R-GMLC 154 used to send location information directly from MSC/SGSN 140 to R-GMLC 154, e.g., if GMLC short circuit is accepted; and
8. other relevant information.

In an embodiment, the presence of the R-GMLC address indicates that GMLC short circuit is requested and accepted and that R-GMLC 154 can support the necessary MAP operation. The address of H-GMLC 152 may be used if GMLC short circuit is not requested or is rejected and may also be used for a final location estimate transferred to the LCS client in order to notify V-GMLC 150 and H-GMLC 152 that the procedure is terminating.

MSC/SGSN 140 sends to UE 120 an LCS MO-LR Return Result message that contains the information received from V-GMLC 150 (step 13). The LCS MO-LR Return Result message may further include (1) a list of PLMNs in which periodic location reporting is allowed and (2) an indication for each PLMN as to whether periodic location reporting is supported by the RANs in the PLMN. If this list of PLMNs is not provided, then subsequent MO-LR requests may be restricted to the current serving PLMN. Any agreement on using GMLC short circuit and/or MO-LR short circuit may be applicable to all of the PLMNs in the list.

UE 120 may instigate release of the Connection Management (CM), Mobility Management (MM) or GPRS Mobility Management (GMM), and Radio Resource Control (RR/RRC) connections to the UE (not shown in FIG. 3), e.g., if the periodic location request is rejected, or if the list of PLMNs does not include the serving PLMN, or if the serving PLMN was included with a lower priority, or if the first location estimate is not needed yet. Alternatively, if the periodic location request is accepted and the serving PLMN can be used for subsequent location reporting events and the first location estimate is allowed immediately, then UE 120 may initiate reporting of the first location estimate by sending an LCS MO-LR Location Services Invoke message to request transfer of the UE location to LCS client 170 (also not shown in FIG. 3). Periodic location reporting is then performed as indicated by the periodic location information (steps 14a through 14n).

As shown in FIGS. 2 and 3, a sequence of messages may be initially exchanged between R-GMLC 154, H-GMLC 152, V-GMLC 150 and MSC/SGSN 140 for security and privacy and to provide each entity with pertinent information for the periodic location request. GMLC short circuit may thereafter be used to achieve efficient periodic location reporting, as described below. Each of V-GMLC 150, H-GMLC 152, R-GMLC 154, and MSC/SGSN 140 may store or cache pertinent information for the periodic location request from LCS client 170 (for message flow 200 in FIG. 2) or from UE 120

(for message flow 300 in FIG. 3). The cached information may include, for example, the reference ID for the periodic location request, the addresses of other network entities, the identifier of target UE 120, the periodic location information, indications as to whether GMLC short circuit and/or MO-LR short circuit are allowed, the LCS QoS, and so on. The cached information may be used for subsequent location reporting to provide the UE location information to LCS client 170.

The periodic location reporting in steps 16a through 16n of message flow 200 and in steps 14a through 14n of message flow 300 may be performed in various manners. In one embodiment, for each location reporting event determined by the periodic location information, UE 120 initiates a one-shot MO-LR message flow to provide its location estimate to LCS client 170. UE 120 may also initiate an MO-LR message flow whenever needed in order to obtain updated assistance data and/or to compute a new location estimate for itself. In another embodiment, for each location reporting event, R-GMLC 154 initiates a one-shot MT-LR message flow to obtain a location estimate for UE 120 and to send this location estimate to LCS client 170. In yet another embodiment, for each location reporting event, RAN 130 initiates location processing to provide the location estimate for UE 120 to LCS client 170. For all embodiments, the first location reporting event may occur immediately after completing the message exchange to initiate periodic location reporting. The location reporting may continue until one of the following events occurs:

1. the reporting duration has elapsed or the total number of reports has been attained;
2. periodic location reporting is cancelled by LCS Client 170, R-GMLC 154 or H-GMLC 152 (e.g., via an MT-LR cancellation procedure); or
3. UE 120 terminates the periodic location reporting.

Figure 4:
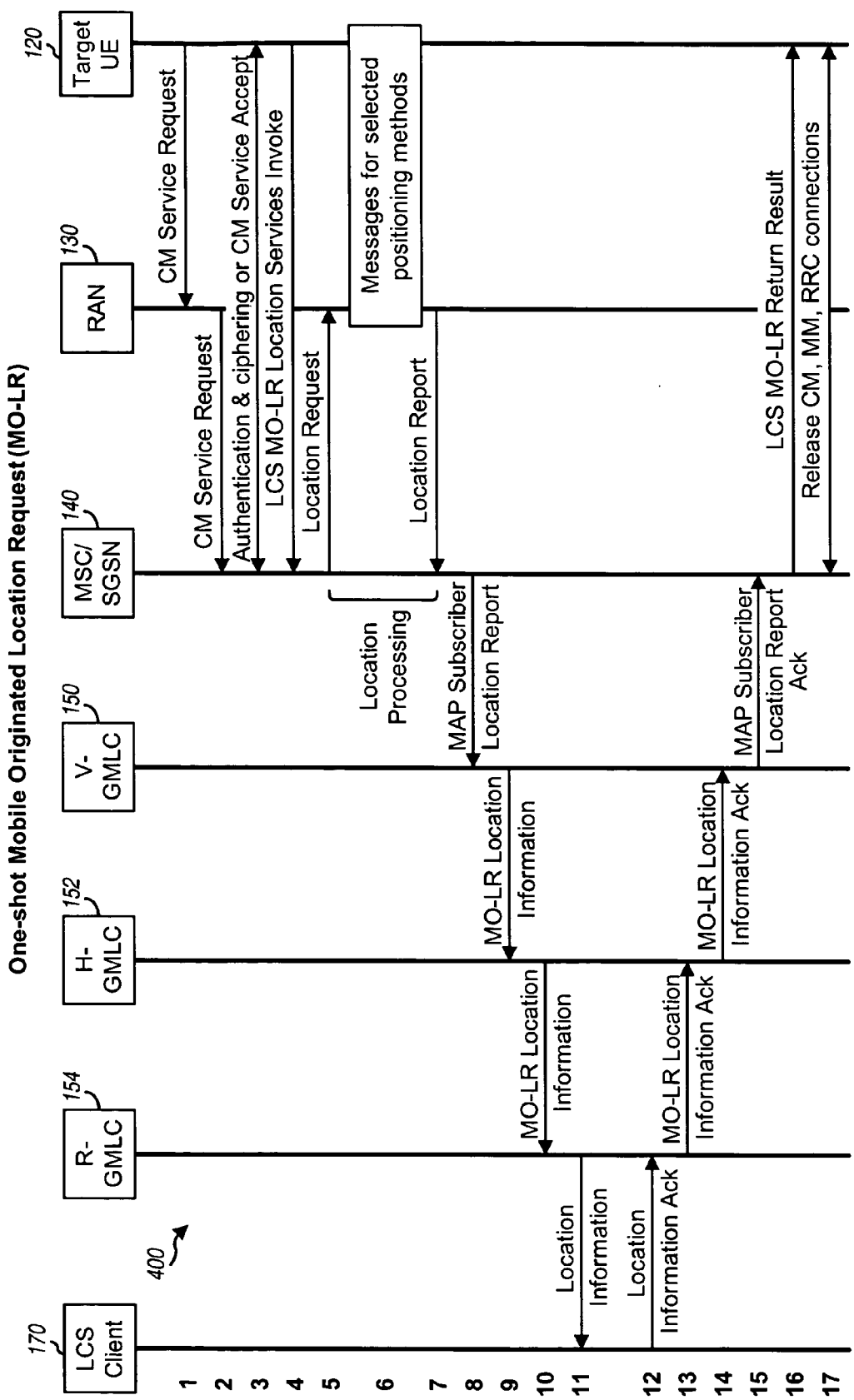
FIG. 4 shows a message flow for one-shot MO-LR.

FIG. 4 shows a message flow 400 for one-shot MO-LR. UE 120 may use all or part of message flow 400 to (1) request its own location for basic self location, (2) request location assistance data for autonomous self location, (3) request a transfer of the UE location to an LCS client for a transfer to a third party (TTTP), or (4) achieve some other result. UE 120 may also use message flow 400 for each of the location reporting events in message flow 200 in FIG. 2 and message flow 300 in FIG. 3.

Steps 1 through 3 of message flow 400 are the same as steps 1 through 3 of message flow 300 in FIG. 3. UE 120 then sends to MSC/SGSN 140 an LCS MO-LR Location Services Invoke message to request a desired location service (e.g., to request for location of the UE, location assistance data, transfer of the UE location to an LCS client, and so on) (step 4). The LCS MO-LR Location Services Invoke message contains pertinent information such as, e.g., the LCS QoS (e.g., accuracy and response time), the identity of LCS client 170, the address of H-GMLC 152 or R-GMLC 154, the type of assistance data desired, and so on. UE 120 may also provide its location estimate in the LCS MO-LR Location Services Invoke message (not shown in FIG. 4), e.g., if this location estimate is available and MO-LR short circuit is allowed or preferred.

MSC/SGSN 140 verifies that UE 120 is authorized for the requested location service based on a subscription profile for the UE (also step 4). If the location request is authorized, then MSC/SGSN 140 sends to RAN 130 a Location Request message that contains the type of location information requested, the UE capabilities, and the LCS QoS (step 5). If the MO-LR Location Services Invoke message in step 4 requests a location estimate for UE 120, then RAN 130 selects an appropriate positioning method based on the location request, the required accuracy, and the UE capabilities. RAN 130 then initiates an appropriate message sequence for the selected positioning method (step 6). RAN 130 receives a report with measurements or a location estimate for UE 120 from the UE and/or entities within or associated with the RAN. RAN 130 computes a location estimate for UE 120 if needed and sends to MSC/SGSN 140 a Location Report message that contains the location estimate for the UE (step 7). If the MO-LR Location Services Invoke message in step 4 requests location assistance data for autonomous self-location, then RAN 130 returns assistance data to UE 120 in step 6 and does not return a location estimate in step 7.

If UE 120 requests a transfer of its location estimate to LCS client 170, then MSC/SGSN 140 sends to V-GMLC 150 a MAP Subscriber Location Report message that contains the location estimate for the UE and other relevant information (step 8). V-GMLC 150 then sends to H-GMLC 152 an MO-LR Location Information message that contains the location estimate and relevant information (step 9). H-GMLC 152 then sends an MO-LR Location Information message to R-GMLC 154 (step 10), which in turn sends the location estimate and relevant information to LCS client 170 (step 11). LCS client 170 responds by sending a location information acknowledgment to R-GMLC 154 (step 12). R-GMLC 154 sends to H-GMLC 152 an MO-LR Location Information Acknowledgment message that indicates whether the location estimate has been successfully sent to LCS client 170 (step 13). H-GMLC 152 forwards the MO-LR Location Information Acknowledgment message to V-GMLC 150 (step 14), which sends a MAP Subscriber Location Report Acknowledgment message to MSC/SGSN 140 (step 15). Steps 8 through 15 may be omitted, or some other steps may be performed, for other types of location services requested by UE 120.

MSC/SGSN 140 sends to UE 120 an LCS MO-LR Return Result message that contains a location estimate (if requested by the UE) and possibly other relevant information (step 16). MSC/SGSN 140 may instigate release of the CM, MM or GMM, and RR/RRC connections to UE 120, if the UE was previously idle (step 17). Step 17 of message flow 400 may be omitted if UE 120 is in the dedicated mode.

Most of message flow 400 is described in documents 3GPP TS 23.171 version 3.11.0 and 3GPP TS 23.271 version 6.10.0. However, these versions of the 3GPP standards do not allow the target UE to provide its location estimate in step 4 for MO-LR short circuit or to provide the address of R-GMLC 154 in step 4 for GMLC short circuit.

Figure 5:
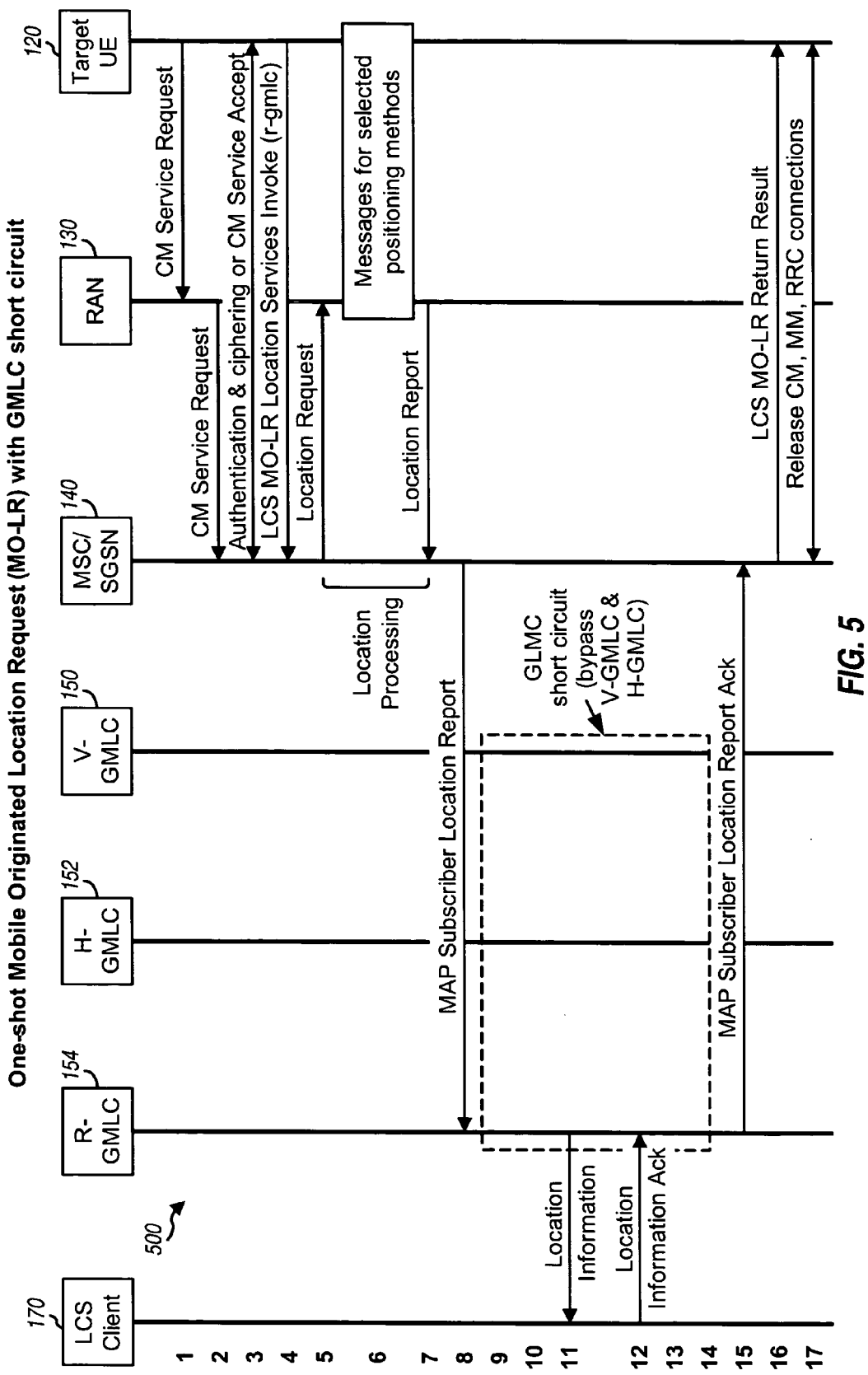
FIG. 5 shows a message flow for one-shot MO-LR with GLMC short circuit.

FIG. 5 shows a message flow 500 for one-shot MO-LR with GLMC short circuit. Message flow 500 may be used in place of message flow 400 in FIG. 4 if GMLC short circuit is allowed. Message flow 500 may be used for each of the location reporting events in message flow 200 in FIG. 2 and message flow 300 in FIG. 3.

Message flow 500 includes a subset of the steps in message flow 400. Steps 1 through 7 of message flow 500 are similar to steps 1 through 7 of message flow 400. In an embodiment, the LCS MO-LR Location Services Invoke message sent in step 4 of message flow 500 includes the reference ID for the periodic location request previously initiated, the periodic location information, the address of R-GMLC 154 ("r-gmlc") if GMLC short circuit is allowed, the LCS QoS, and so on. The presence of the reference ID may indicate that the current location request and its attributes (e.g., the use of GMLC short circuit, the use of MO-LR short circuit, and so on) have previously been authorized by R-GMLC 154, H-GMLC 152, and V-GMLC 150 (e.g., using the procedures in FIG. 2 or 3).

In another embodiment, MSC/SGSN 140 may store (e.g., in steps 8 and/or 12 of message flow 200, or in step 12 of message flow 300) information that tells MSC/SGSN 140 that the periodic location reporting has been authorized by R-GMLC 154, H-GMLC 152, and V-GMLC 150. In yet another embodiment, the LCS MO-LR Location Services Invoke message sent in step 4 of message flow 500 may contain information that tells MSC/SGSN 140 that the location reporting (e.g., message flow 500) has been authorized by R-GMLC 154, H-GMLC 152, and V-GMLC 150. For the last location reporting event, the LCS MO-LR Location Services Invoke message may further include the H-GMLC address (even if GMLC short circuit is used) in order to notify V-GMLC 150 and H-GMLC 152 that the periodic location reporting is terminating.

MSC/SGSN 140 sends to RAN 130 a Location Request message to request for a location estimate for UE 120 (step 5) and receives from RAN 130 a Location Report message that contains the location estimate (step 7). MSC/SGSN 140 then sends directly to R-GMLC 154, using the R-GMLC address provided by UE 120 or stored by MSC/SGSN 140, a MAP Subscriber Location Report message (as shown in FIG. 5) or an MO-LR Location Information message (not shown in FIG. 5) that contains the location estimate for the UE and other relevant information (step 8). R-GMLC 154 sends the location information to LCS client 170 (step 11), receives an acknowledgment from the LCS client (step 12), and sends directly to MSC/SGSN 140 a MAP Subscriber Location Report Acknowledgment message (as shown in FIG. 5) or an MO-LR Location Information Acknowledgment message (not shown in FIG. 5) (step 15). Steps 9, 10, 13 and 14 are short circuited and V-GMLC 150 and H-GMLC 152 are bypassed, which reduces network traffic and improves the response time for sending the location information to LCS client 170.

Figure 6:
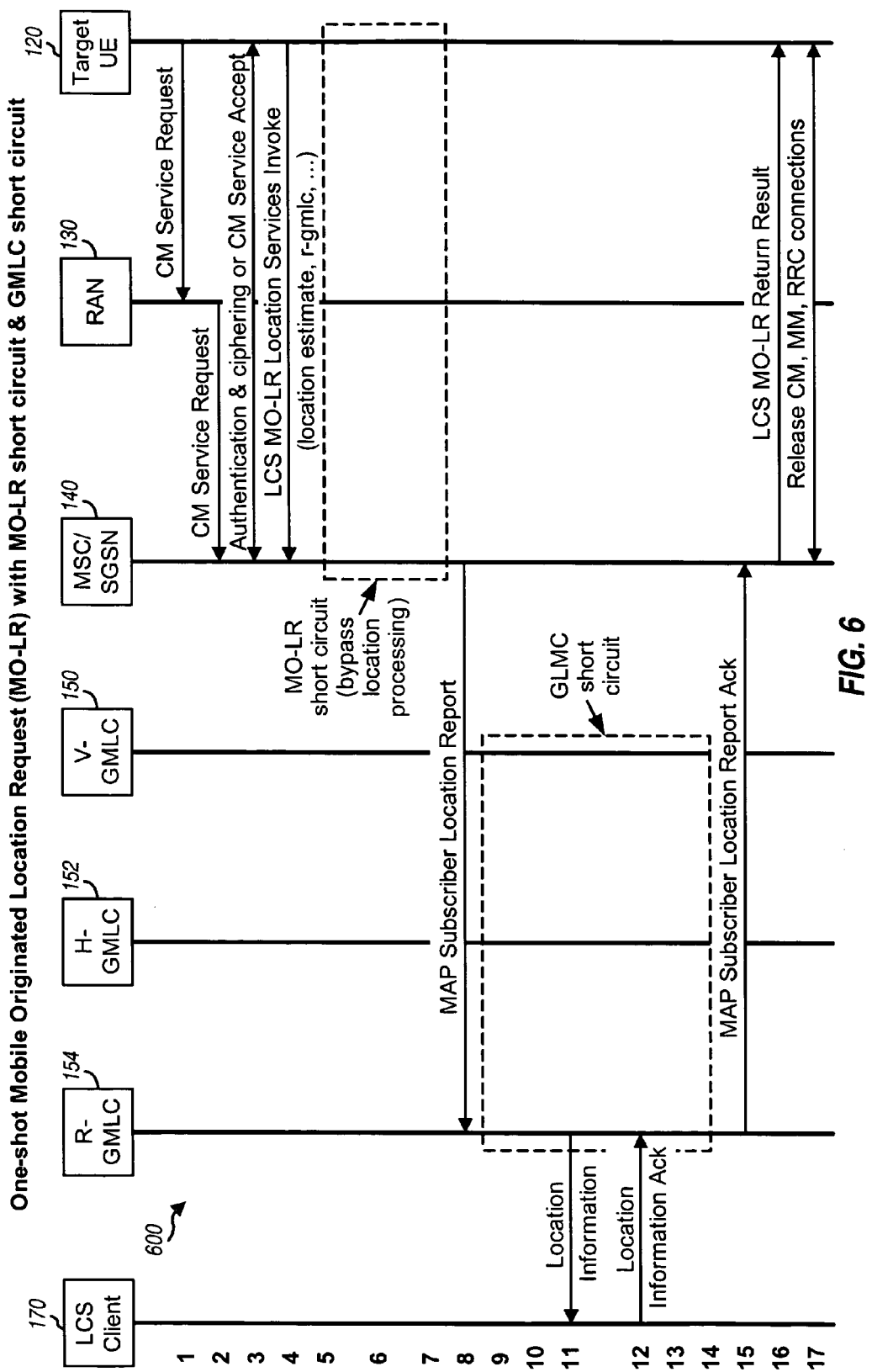
FIG. 6 shows a message flow for one-shot MO-LR with GLMC short circuit and MO-LR short circuit.

FIG. 6 shows a message flow 600 for one-shot MO-LR with GLMC short circuit and MO-LR short circuit. Message flow 600 may be used in place of message flow 400 in FIG. 4 and message flow 500 in FIG. 5 if GMLC short circuit and MO-LR short circuit are allowed. Message flow 600 may be used for each of the location reporting events in message flow 200 in FIG. 2 and message flow 300 in FIG. 3.

Message flow 600 includes a subset of the steps in message flows 400 and 500. Steps 1 through 4 of message flow 600 are similar to steps 1 through 4 of message flow 400. One difference is that the LCS MO-LR Location Services Invoke message sent in step 4 of message flow 600 may include the reference ID for the previously initiated periodic location request, a location estimate for the UE (e.g., if UE-based mode is supported and MO-LR short circuit is allowed), the address of R-GMLC 154, and so on. MSC/SGSN 140 receives the LCS MO-LR Location Services Invoke message, decides to use the location estimate sent by UE 120, and bypasses the location processing in steps 5 through 7. MSC/SGSN 140 then sends a MAP Subscriber Location Report message (as shown in FIG. 6) or an MO-LR Location Information message (not shown in FIG. 6) that contains the location estimate for the UE and other relevant information (e.g., an indication that MO-LR short circuit was used) directly to R-GMLC 154 using the R-GMLC address provided by UE 120 (step 8). The remaining steps of message flow 600 are as described above for message flow 500 in FIG. 5.

For message flow 600, steps 5 through 7 are bypassed for the MO-LR short circuit, which avoids involvement of RAN 130 and reduces over-the-air traffic. Steps 9, 10, 13 and 14 are bypassed for the GMLC short circuit, which reduces both network traffic and involvement of V-GMLC 150 and H-GMLC 152. Both types of short circuit improve the response time to send the location information to LCS client 170.

Figure 7:
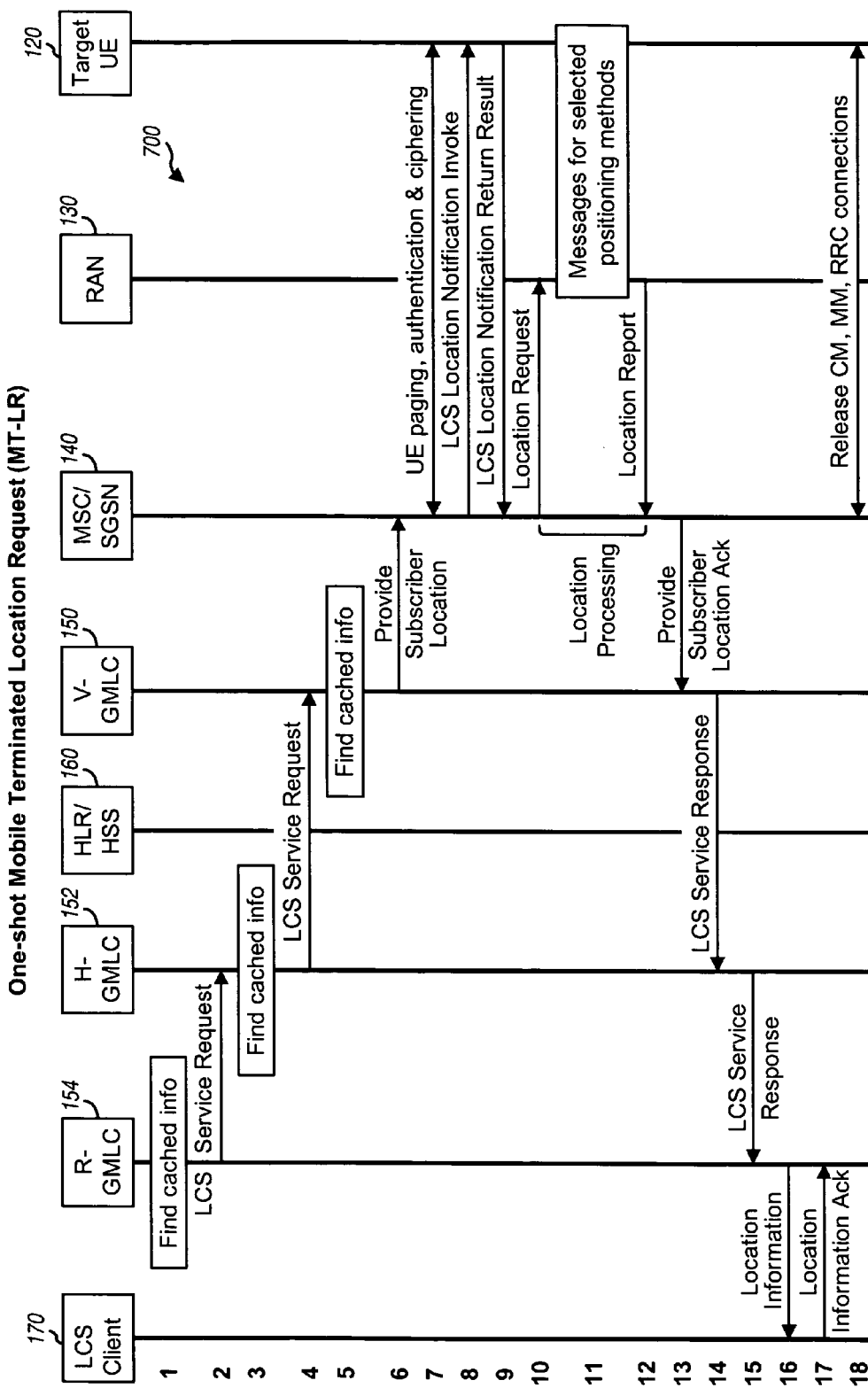
FIG. 7 shows a message flow for one-shot MT-LR.

FIG. 7 shows a message flow 700 for one-shot MT-LR, which may be used for each of the location reporting events in message flow 200 in FIG. 2 and message flow 300 in FIG. 3. For message flow 700, R-GMLC 154 finds the cached information (e.g., the H-GMLC address) for the periodic location request that was previously initiated (step 1). R-GMLC 154 then sends to H-GMLC 152 an LCS Service Request message that contains a request for UE location and relevant information (step 2). H-GMLC 152 finds the cached information (e.g., the V-GMLC address) for the periodic location request (step 3) and sends an LCS Service Request message to V-GMLC 150 (step 4). V-GMLC 150 finds the cached information (e.g., the MSC/SGSN address) for the periodic location request (step 5) and sends a Provide Subscriber Location message (as shown in FIG. 7) or an LCS Service Request message (not shown in FIG. 7) to MSC/SGSN 140 to request the current location of UE 120 (step 6). MSC/SGSN 140 may authenticate that the location request is allowed (also step 6).

MSC/SGSN 140 instigates paging, authentication, and ciphering if UE 120 is in the idle mode (step 7). MSC/SGSN 140 then sends to UE 120 an LCS Location Notification Invoke message to request a location estimate for UE 120 (step 8). UE 120 returns an LCS Location Notification Return Result message (step 9). Location processing may then be performed in steps 10, 11 and 12, e.g., as described above for steps 5, 6 and 7 of message flow 400 in FIG. 4. MSC/SGSN 140 then sends to V-GMLC 150 a Provide Subscriber Location Acknowledgment message (as shown in FIG. 7) or an LCS Service Response message (not shown in FIG. 7) that contains the location estimate for UE 120 and other relevant information (step 13). V-GMLC 150 sends an LCS Service Response message to H-GMLC 152 (step 14), which sends an LCS Service Response message to R-GMLC 154 (step 15). R-GMLC 154 then sends location information (e.g., the location estimate for UE 120) to LCS client 170 (step 16). LCS client 170 responds by sending a location information acknowledgment to R-GMLC 154 (step 17). After obtaining the location estimate for UE 120 in step 12, MSC/SGSN 140 may instigate release of the CM, MM or GMM, and RR/RRC connections to UE 120 (step 18).

Figure 8:
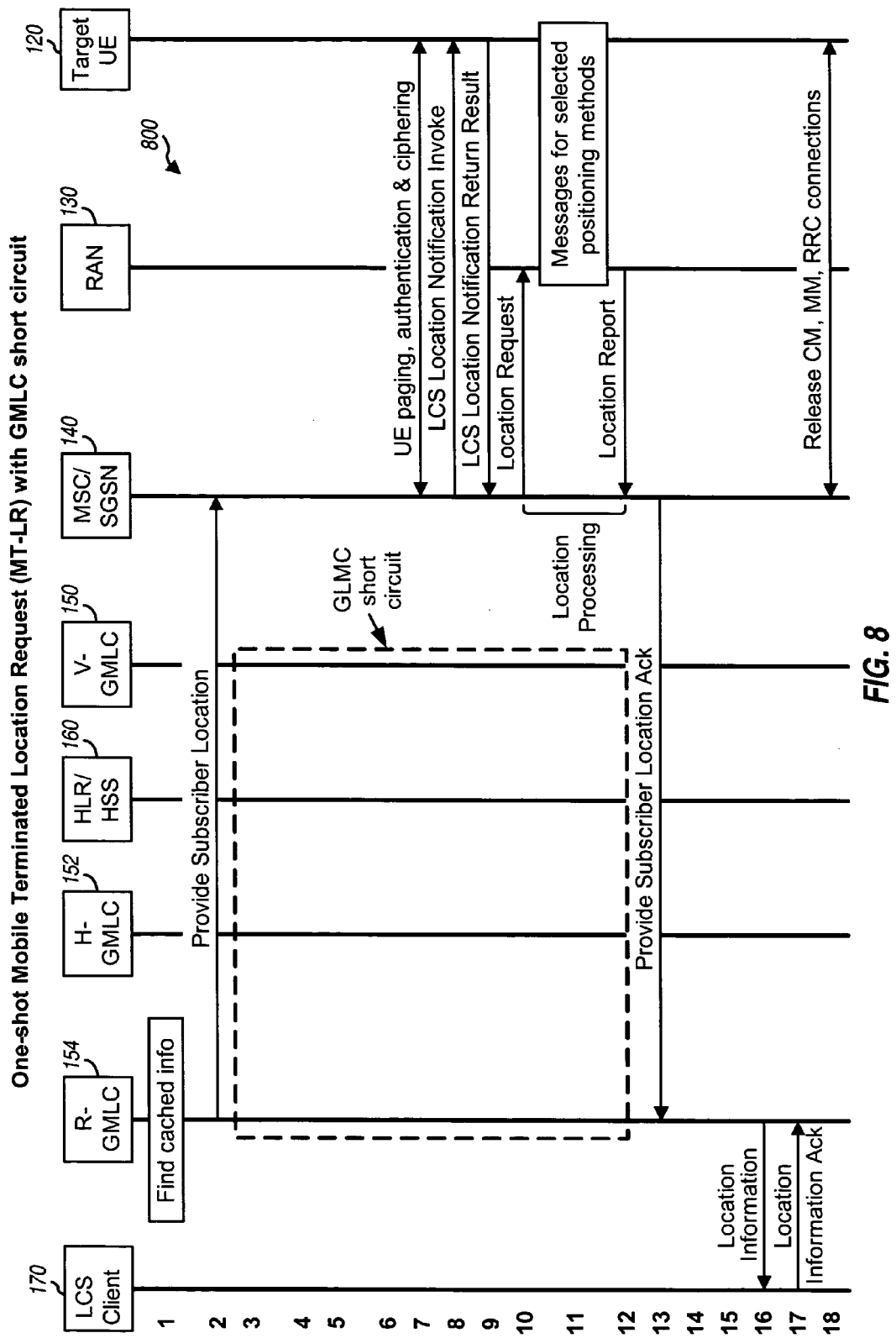
FIG. 8 shows a message flow for one-shot MT-LR with GLMC short circuit.

FIG. 8 shows a message flow 800 for one-shot MT-LR with GLMC short circuit. Message flow 800 may be used in place of message flow 700 in FIG. 7 if GMLC short circuit is allowed. Message flow 800 may be used for each of the location reporting events in message flow 200 in FIG. 2 and message flow 300 in FIG. 3.

Message flow 800 includes a subset of the steps in message flow 700. For message flow 800, R-GMLC 154 finds the cached information (e.g., the MSC/SGSN address) for the periodic location request that was previously initiated (step 1). R-GMLC 154 then sends directly to MSC/SGSN 140 a Provide Subscriber Location message (as shown in FIG. 8) or an LCS Service Request message (not shown in FIG. 8) that contains a request for UE location and relevant information (step 2). Steps 7 through 12 of message flow 800 are the same as steps 7 through 12 of message flow 700. MSC/SGSN 140 receives a location estimate for UE 120 from RAN 130 and sends to R-GMLC 154 a Provide Subscriber Location Acknowledgment message (as shown in FIG. 8) or an LCS Service Response message (not shown in FIG. 8) that contains the location estimate for UE 120 (step 13). R-GMLC 154 sends the location information to LCS client 170 (step 16) and receives an acknowledgment from the LCS client (step 17). Steps 3, 4, 5, 6, 14 and 15 are short circuited and V-GMLC 150 and H-GMLC 152 are bypassed for message flow 800. For the final location reporting event, R-GMLC 154 may choose to use message flow 700 rather than message flow 800 in order to notify H-GMLC 152 and V-GMLC 150 that the periodic location reporting is terminating. This notification may be of assistance for billing and security, e.g., steps 2 and 4 of message flow 700 for the final location reporting event may include information regarding the number of successful location transfers to LCS client 170 and whether errors were encountered.

Figure 9:
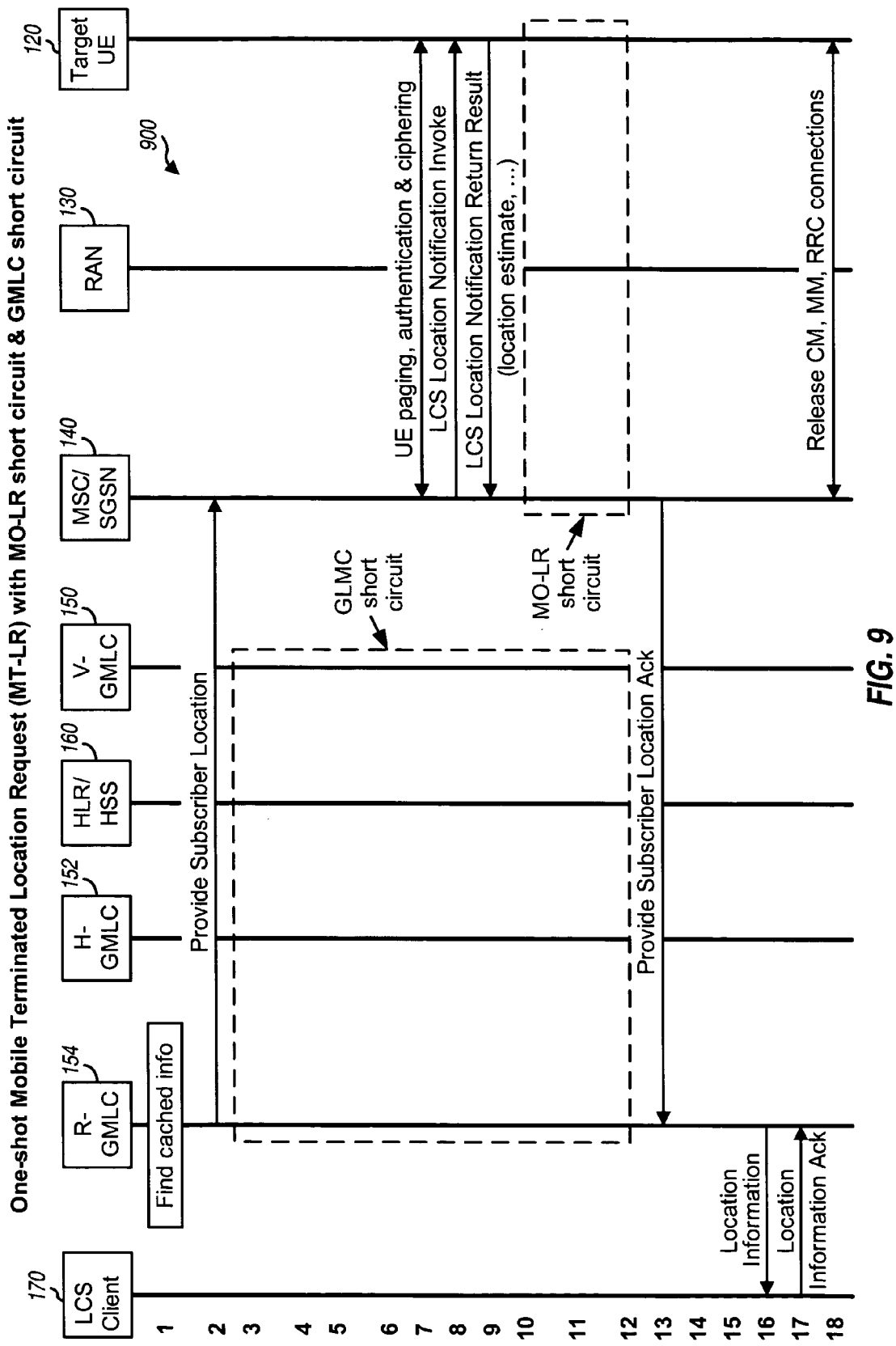
FIG. 9 shows a message flow for one-shot MT-LR with GLMC short circuit and MO-LR short circuit.

FIG. 9 shows a message flow 900 for one-shot MT-LR with GLMC short circuit and MO-LR short circuit. Message flow 900 may be used in place of message flow 700 in FIG. 7 and message flow 800 in FIG. 8 if GMLC short circuit and MO-LR short circuit are both allowed. Message flow 900 may be used for each of the location reporting events in message flow 200 in FIG. 2 and message flow 300 in FIG. 3.

Message flow 900 includes a subset of the steps in message flows 700 and 800. For message flow 900, R-GMLC 154 finds the cached information for the periodic location request that was previously initiated (step 1). R-GMLC 154 then sends an LCS Service Request message that contains a request for UE location and relevant information directly to MSC/SGSN 140 (step 2). Steps 7, 8 and 9 of message flow 900 are similar to steps 7, 8 and 9 of message flow 700. However, the LCS MO-LR Location Services Invoke message sent by UE 120 in step 9 of message flow 900 includes a location estimate for the UE. MSC/SGSN 140 receives this message from UE 120, decides to use the location estimate sent by the UE, and bypasses the location processing in steps 10 through 12. MSC/SGSN 140 then sends a MAP Subscriber Location Report message that contains the location estimate for the UE and other relevant information directly to R-GMLC 154 (step 13). The remaining steps of message flow 900 are as described above for message flow 800.

In message flow 900, steps 10 through 12 are bypassed for the MO-LR short circuit, which reduces over-the-air traffic and/or signaling traffic in RAN 130 and also reduces delay. Steps 3, 4, 5, 6, 14 and 15 are bypassed for the GMLC short circuit, which reduces network traffic and delay.

For a periodic location request initiated by message flow 200 or 300, location reporting may be repeated at a specified interval or following the occurrence of certain events. Each location reporting event causes a single location estimate for UE 120 to be sent to LCS client 170. If periodic location reporting is supported by RAN 130, then the location reporting may be repeated at some multiple of the specified interval, with each RAN invocation causing multiple location estimates for UE 120 (obtained by RAN 130) to be sent to LCS client 170.

UE 120 may be responsible for ensuring that a location report is sent to R-GMLC 154 at the specified intervals or following specified events even if, in the case of MO-LR short circuit and UE-based mode, the UE cannot obtain a location estimate. UE 120 may initiate an MO-LR request (e.g., message flow 600) at the specified intervals or following specified events but may not include any location estimate (e.g., in step 4 of message flow 600). The location report received by R-GMLC 154 (e.g., in step 8 of message flow 600) would then notify R-GMLC 154 that the procedure has not terminated even though UE 120 is currently unable to obtain a location estimate. This periodic reporting enables R-GMLC 154 to determine whether UE 120 may have moved out of the coverage of the PLMN(s) within which periodic location reporting is allowed. R-GMLC 154 may make this determination if it receives no location reporting (e.g., in step 8 of message flow 600) for some time period greater (e.g., more than two times greater) than the expected maximum time interval between periodic location reports (e.g., between consecutive instances of step 8 in message flow 600). R-GMLC 154 may cancel the periodic location reporting by sending an LCS Cancel Service request to H-GMLC 152 whenever R-GMLC 154 infers from the absence of periodic location reports that the service may have been terminated. H-GMLC 152 forwards this message to V-GMLC 150, which forwards it to MSC/SGSN 140, which in turn sends an LCS Periodic Event cancellation to UE 120, if UE 120 is reachable.

UE 120 terminates the periodic location reporting if (1) UE 120 moves out of coverage of the PLMN(s) within which location reporting is allowed, (2) a conflict with the PLMNs preferred by UE 120 for other services prevents access to the PLMNs assigned for periodic location reporting, (3) an MO-LR request is denied by the current serving PLMN with an indication that the periodic location reporting cannot or can no longer be supported, (4) the UE subscriber terminates the periodic location reporting, or (5) some other termination condition has occurred. UE 120 may detect conditions (1) and (2) if the UE is unable to instigate an MO-LR request for some period of time T, where T may be some multiple of the specified location reporting interval, if fixed, or some multiple of the maximum expected (or maximum allowed) reporting interval otherwise. UE 120 may encounter condition (3) if, e.g., MO-LR short circuit was initially allowed but can no longer be supported by the UE or the current serving PLMN. UE 120 may terminate the periodic location reporting by sending an MO-LR TTTP report without a location estimate, but with a termination cause, to MSC/SGSN 140, which then transfers this indication to V-GMLC 150, H-GMLC 152, and R-GMLC 154. This speeds up notification to the GMLCs and LCS client 170 and allows a specific reason for the termination to be given.

For clarity, each of the message flows in FIGS. 2 through 9 shows a specific sequence of steps. Each message flow may include additional, fewer, or different steps than the steps shown for that message flow. The steps for each message flow may be performed in the order shown in that message flow or in a different order. Each step in each message flow may in general include any number of message exchanges, any type of processing at any entity, and so on.

Also for clarity, specific messages used by 3GPP are shown for the message flows in FIGS. 2 through 9. Other networks and other location architectures typically use messages that are different from the messages described above. In general, any signaling may be used to exchange pertinent information among the various entities to achieve the functionality described above for location reporting, GMLC short circuit, and MO-LR short circuit. The signaling may comprise messages, packets, indications, flags, or data sent in some other form.

For clarity, the location reporting techniques have been specifically described above for 3GPP-based networks and for a control plane architecture. The techniques may also be used for other networks and other architectures, such as a SUPL architecture and a pre-SUPL architecture promulgated by Open Mobile Alliance (OMA), a 3GPP2 control plane architecture described in IS-881 and 3GPP2 X.S0002, and so on. The short circuit techniques may also be used for circuit-switched (CS) based modes and packet-switched (PS) based modes, although the messages for the message flows may be different.

Figure 10:
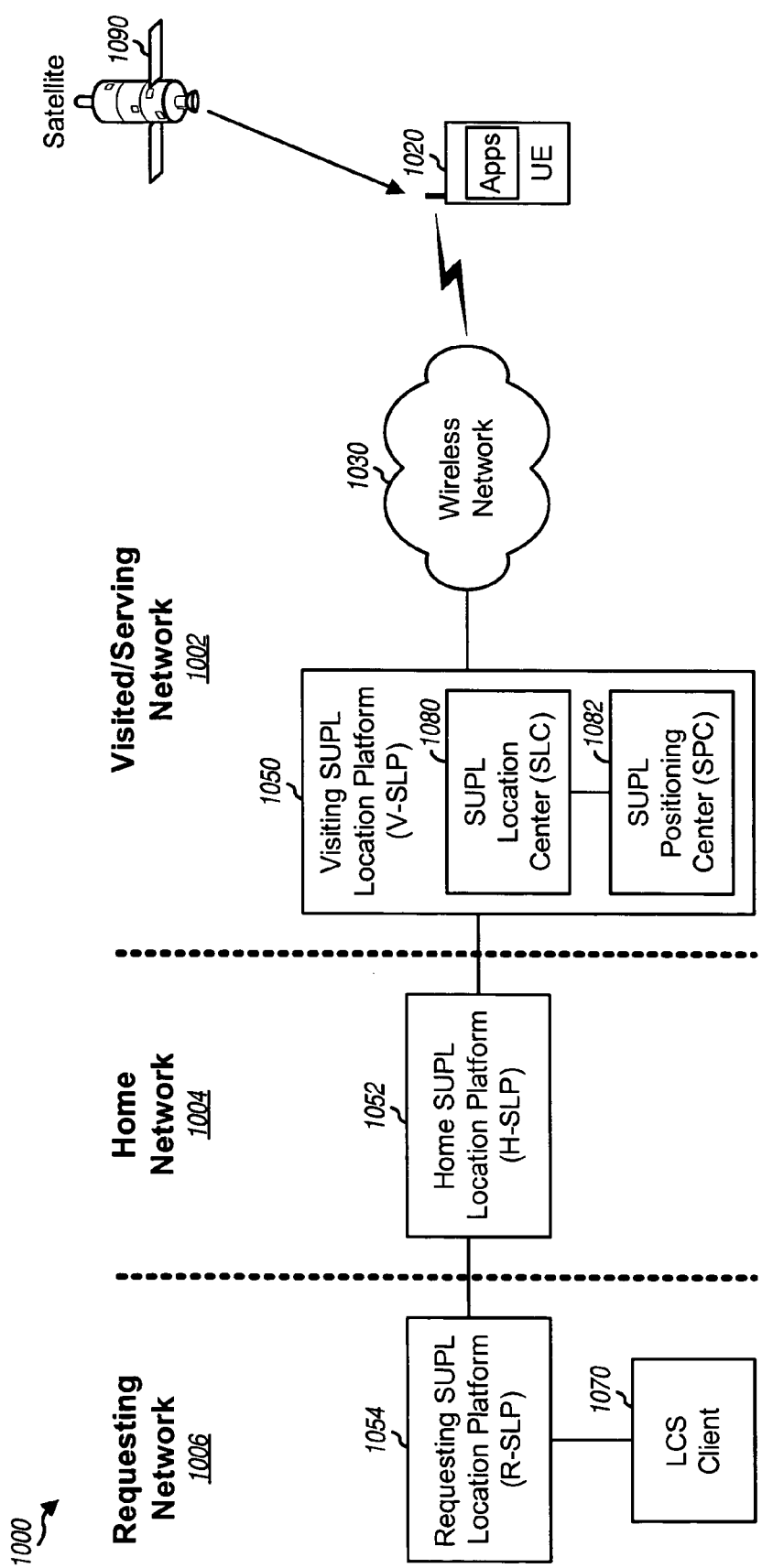
FIG. 10 shows another network deployment.

FIG. 10 shows a SUPL deployment 1000 that includes a visited/serving network 1002, a home network 1004, and a requesting network 1006. Visited network 1002 includes a wireless network 1030 and a visiting SUPL location platform (V-SLP) 1050. Wireless network 1030 provides wireless communication for wireless devices located within the coverage area of the wireless network. A wireless device is also called a SUPL enabled terminal (SET). V-SLP 1050 includes a SUPL location center (SLC) 1080 and may include a SUPL positioning center (1082). SLC 1080 is similar to V-GMLC 150 and performs various functions for location services. SPC 1082 is similar to an SMLC and supports positioning for wireless devices. Home network 1004 includes a home SLP (H-SLP) 1052 that supports location services and positioning for home network 1004. Requesting network 1006 includes a requesting SLP (R-SLP) 1054 that supports location services and positioning for LCS clients. V-SLP 1050, R-SLP 1054, and H-SLP 1052 may generically be referred to as first, second, and third location centers, respectively, that are associated with different networks.

GMLC short circuit and MO-LR short circuit may be used for SUPL deployment 1000. For short circuit in a non-proxy mode, a wireless device 1020 may send a location estimate directly to R-SLP 1054, which then forwards the location estimate to an LCS client 1070. For short circuit in a proxy mode, wireless device 1020 may send a location estimate to H-SLP 1052, which then forwards the location estimate to R-SLP 1054, which further forwards the location estimate to LCS client 1070.

Figure 11:
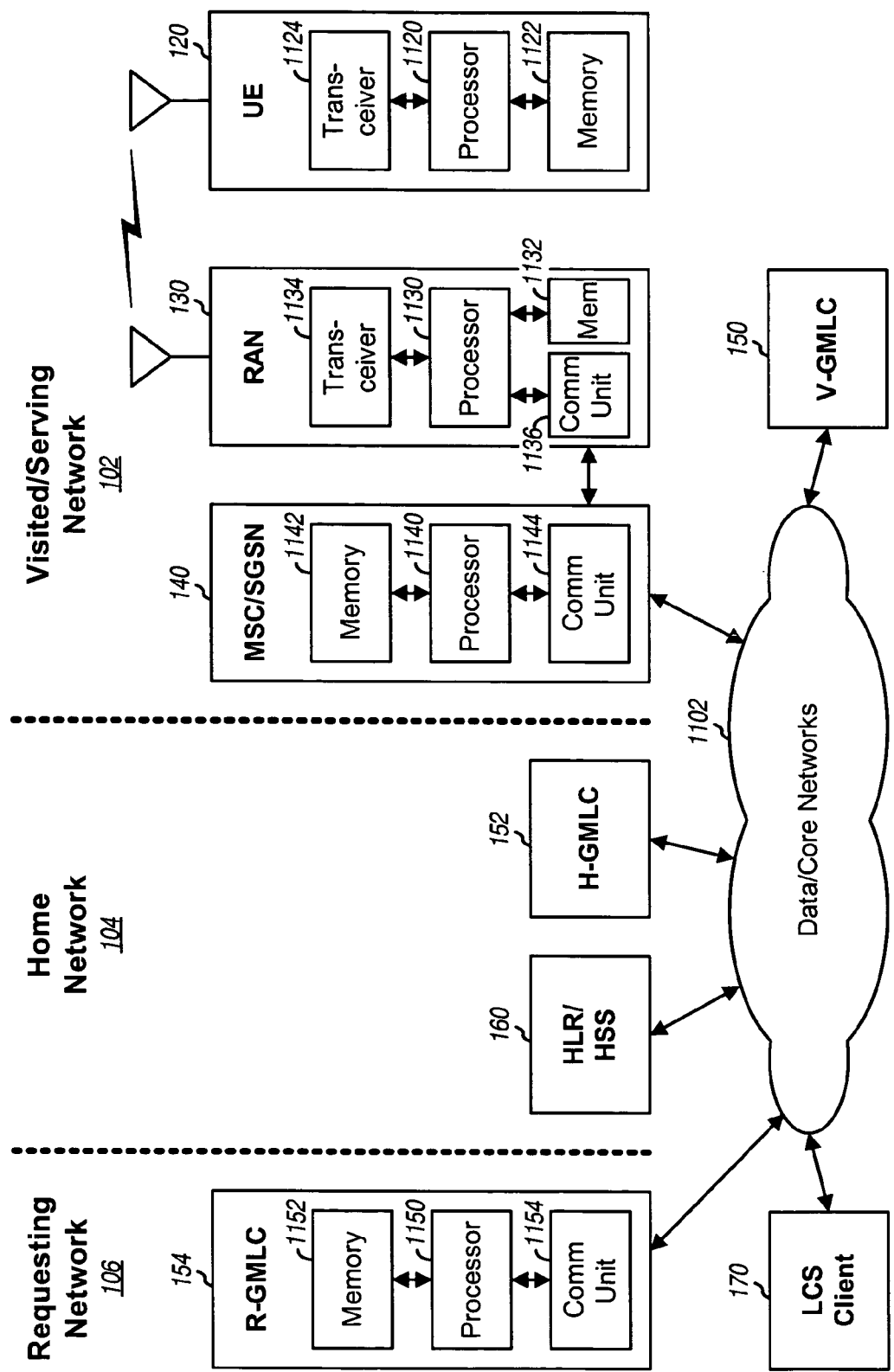
FIG. 11 shows a block diagram of various network entities in FIG. 1.

FIG. 11 shows a block diagram of various network entities and UE 120 in 3GPP-based network 100 in FIG. 1. RAN 130 provides wireless communication for visited network 102 and may include multiple base stations or Node Bs. On the downlink, base stations in RAN 130 transmit traffic data, signaling, and pilot to the UEs within its coverage area. These various types of data are processed by a processor 1130 and conditioned by a transceiver 1134 to generate a downlink signal, which is transmitted via an antenna. At UE 120, the downlink signals from one or more base stations in RAN 130 are received via an antenna, conditioned by a transceiver 1124, and processed by a processor 1120 to obtain various types of information for location services. For example, processor 1120 may obtain time of arrival of received signals (which may be used for positioning), decoded messages used for the message flows described above, and so on. Memory units 1122 and 1132 store program codes and data for processors 1120 and 1130, respectively, at UE 120 and RAN 130. On the uplink, UE 120 may transmit traffic data, signaling, and pilot to one or more base stations in RAN 130. These various types of data are processed by processor 1120 and conditioned by transceiver 1124 to generate an uplink signal, which is transmitted via the UE antenna. At RAN 130, the uplink signal from UE 120 and other UEs are received and conditioned by transceiver 1134 and further processed by processor 1130 to obtain various types of information (e.g., data, signaling, reports, and so on). A communication (Comm) unit 1136 allows RAN 130 to communicate with MSC/SGSN 140.

MSC/SGSN 140 includes a processor 1140 that performs processing for MSC/SGSN 140, a memory unit 1142 that stores program codes and data for processor 1140, and a communication unit 1144 that allows MSC/SGSN 140 to communicate with RAN 130 and other network entities via data/core networks 1102. R-GMLC 154 includes a processor 1150 that performs processing for R-GMLC 154, a memory unit 1152 that stores program codes and data for processor 1150, and a communication unit 1154 that allows R-GMLC 154 to communicate with other network entities via data/core networks 1102. In general, each network entity may include one or more processors, memory units, communication units, controllers, and so on. Data/core networks 1102 may include (1) core networks for visited network 102, home network 104, and/or requesting network 106 and/or (2) other private and/or public data networks.

The techniques described herein may be implemented by various means. For example, the techniques may be implemented in hardware, software, or a combination thereof. For a hardware implementation, the units used to perform the processing at each entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 1122, 1132, 1142, or 1152 in FIG. 11) and executed by a processor (e.g., processor 1120, 1130, 1140, or 1150). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of providing location services, comprising:
performing location processing with a user equipment (UE) to obtain a location estimate for the UE, wherein the UE is roaming on a serving network that is associated with a first location center, and wherein the serving network is distinct from a home network for the UE; and
sending the location estimate for the UE from a Mobile Switching Center (MSC) or a Serving GPRS (General Packet Radio Service) Support Node (SGSN) of the serving network directly to a second location center and bypassing the first location center, wherein the second location center is associated with a client entity receiving the location estimate for the UE, and wherein the first and second location centers are associated with different networks.

2. The method of claim 1, wherein the sending the location estimate for the UE comprises
sending the location estimate for the UE directly to the second location center and bypassing the first location center and a third location center, wherein the third location center is associated with the home network for the UE.

3. The method of claim 1, wherein the first location center is a visited gateway mobile location center (V-GMLC), and wherein the second location center is a requesting gateway mobile location center (R-GMLC).

4. The method of claim 1, wherein the first location center is a visiting Secure User Plane Location (SUPL) location platform (V-SLP), and wherein the second location center is a requesting SLP (R-SLP).

5. The method of claim 1, further comprising:
receiving the location estimate for the UE from the UE; and
bypassing the location processing if the location estimate received from the UE is selected for use.

6. The method of claim 1, further comprising:
receiving from the UE a request to send the location estimate for the UE to the client entity, and wherein the performing location processing with the UE and the sending the location estimate for the UE are performed in response to the request.

7. The method of claim 1, further comprising:
receiving from the UE an address of the second location center; and
using the address of the second location center to send the location estimate for the UE directly to the second location center.

8. The method of claim 1, further comprising:
receiving from the second location center a request to send the location estimate for the UE to the client entity, and wherein the performing location processing with the UE and the sending the location estimate for the UE are performed in response to the request.

9. The method of claim 1, further comprising:
receiving from the UE a request for periodic reporting of UE location to the client entity; and
repeating the performing location processing with the UE and the sending the location estimate for the UE directly to the second location center based on periodic location information indicative of when to send the location estimate for the UE to the client entity.

10. The method of claim 1, further comprising:
receiving a request sent by the client entity for periodic reporting of UE location to the client entity; and
repeating the performing location processing with the UE and the sending the location estimate for the UE directly to the second location center based on periodic location information indicative of when to send the location estimate for the UE to the client entity.

11. The method of claim 1, further comprising:
receiving a request to bypass the first location center; and
accepting or rejecting the request to bypass the first location center.

12. The method of claim 1, further comprising:
receiving a request to bypass the location processing; and
accepting or rejecting the request to bypass the location processing.

13. The method of claim 1, wherein the sending the location estimate for the UE comprises
sending the location estimate for the UE directly to a requesting gateway mobile location center (R-GMLC) and bypassing a visited gateway mobile location center (V-GMLC) and a home gateway mobile location center (H-GMLC).

14. The method of claim 1, further comprising:
receiving a request to bypass the first location center;
accepting or rejecting the request to bypass the first location center;
receiving from the UE a request for periodic reporting of UE location to the client entity; and
repeating the performing location processing with the UE and the sending the location estimate for the UE directly to the second location center based on periodic location information indicative of when to send the location estimate for the UE to the client entity.

15. The method of claim 1, further comprising:
sending, from the MSC or the SGSN of the serving network to a radio access network (RAN) of the serving network, a request for the location estimate for the UE; and
receiving, at the MSC or the SGSN of the serving network, the location estimate for the UE from the RAN of the serving network in response to the request.

16. An apparatus comprising:
a processor operative to perform location processing with a user equipment (UE) to obtain a location estimate for the UE, wherein the UE is roaming on a serving network that is associated with a first location center, and wherein the serving network is distinct from a home network for the UE; and
a communication unit operative to send the location estimate for the UE from a Mobile Switching Center (MSC) or a Serving GPRS (General Packet Radio Service) Support Node (SGSN) of the serving network directly to a second location center and bypassing the first location center, wherein the second location center is associated with a client entity receiving the location estimate for the UE, and wherein the first and second location centers are associated with different networks.

17. The apparatus of claim 16, wherein the processor is further operative to receive a request to bypass the first location center and to accept or reject the request to bypass the first location center.

18. The apparatus of claim 16, wherein the processor is further operative to receive from the UE an address of the second location center and to send the location estimate for the UE directly to the second location center using the address received from the UE.

19. The apparatus of claim 16, wherein the processor is further operative to receive a request to bypass the first location center, accept or reject the request to bypass the first location center, receive from the UE a request for periodic reporting of UE location to the client entity, and repeat the performing location processing with the UE and the sending the location estimate for the UE directly to the second location center based on periodic location information indicative of when to send the location estimate for the UE to the client entity.

20. An apparatus comprising:
means for performing location processing with a user equipment (UE) to obtain a location estimate for the UE, wherein the UE is roaming on a serving network that is associated with a first location center, and wherein the serving network is distinct from a home network for the UE; and
means for sending the location estimate for the UE from a Mobile Switching Center (MSC) or a Serving GPRS (General Packet Radio Service) Support Node (SGSN) of the serving network directly to a second location center and bypassing the first location center, wherein the second location center is associated with a client entity receiving the location estimate for the UE, and wherein the first and second location centers are associated with different networks.

21. The apparatus of claim 20, further comprising:
means for receiving a request to bypass the first location center; and
means for accepting or rejecting the request to bypass the first location center.

22. The apparatus of claim 20, further comprising:
means for receiving from the UE an address of the second location center; and means for using the address of the second location center to send the location estimate for the UE directly to the second location center.

23. A method of obtaining location services, comprising:
exchanging signaling between a user equipment (UE) and a serving network for a request for location service, wherein the serving network is associated with a first location center and is distinct from a home network for the UE; and
performing location processing with the serving network to obtain a location estimate for the UE, wherein the location estimate for the UE is sent by a Mobile Switching Center (MSC) or a Serving GPRS (General Packet Radio Service) Support Node (SGSN) of the serving network directly to a second location center, bypassing the first location center, wherein the second location center communicates with a client entity receiving the location estimate for the UE, and wherein the first and second location centers are associated with different networks.

24. The method of claim 23, wherein the exchanging signaling between the UE and the serving network comprises
sending the request for location service from the UE to the serving network, and
sending an address of the second location center from the UE to the serving network, and wherein the location estimate for the UE is sent by the serving network directly to the second location center using the address sent by the UE.

25. The method of claim 23, wherein the exchanging signaling between the UE and the serving network comprises
receiving from the serving network the request for location service.

26. The method of claim 23, wherein the exchanging signaling between the UE and the serving network comprises
sending the location estimate for the UE to the serving network, and wherein the location processing is bypassed if the location estimate sent to the serving network is selected for use.

27. The method of claim 23, further comprising:
sending to the serving network a request for periodic reporting of UE location to the client entity; and
repeating the exchanging signaling between the UE and the serving network and the performing location processing with the serving network based on periodic location information indicative of when to send the location estimate for the UE to the client entity.

28. The method of claim 23, further comprising:
receiving from the serving network a request from the client entity for periodic reporting of UE location to the client entity; and
repeating the exchanging signaling between the UE and the serving network and the performing location processing with the serving network based on periodic location information indicative of when to send the location estimate for the UE to the client entity.

29. The method of claim 23, further comprising:
sending a request to bypass the first location center; and
receiving an indication of acceptance or rejection of the request to bypass the first location center.

30. The method of claim 23, further comprising:
sending a request to bypass the location processing; and
receiving an indication of acceptance or rejection of the request to bypass the location processing.

31. An apparatus comprising:
a transceiver operative to exchange signaling between a user equipment (UE) and a serving network for a request for location service, wherein the serving network is associated with a first location center and is distinct from a home network for the UE; and
a processor operative to perform location processing with the serving network to obtain a location estimate for the UE, wherein the location estimate for the UE is sent by a Mobile Switching Center (MSC) or a Serving GPRS (General Packet Radio Service) Support Node (SGSN) of the serving network directly to a second location center, bypassing the first location center, wherein the second location center communicates with a client entity receiving the location estimate for the UE, and wherein the first and second location centers are associated with different networks.

32. The apparatus of claim 31, wherein the processor is further operative to send the request for location service and an address of the second location center from the UE to the serving network, and wherein the location estimate for the UE is sent by the serving network directly to the second location center using the address sent by the UE.

33. The apparatus of claim 31, wherein the processor is further operative to send the location estimate for the UE to the serving network, and wherein the location processing is bypassed if the location estimate sent to the serving network is selected for use.

34. The apparatus of claim 31, wherein the processor is further operative to send a request to bypass the first location center and to receive an indication of acceptance or rejection of the request to bypass the first location center.

35. An apparatus comprising:
means for exchanging signaling between a user equipment (UE) and a serving network for a request for location service, wherein the serving network is associated with a first location center and is distinct from a home network for the UE; and
means for performing location processing with the serving network to obtain a location estimate for the UE, wherein the location estimate for the UE is sent by a Mobile Switching Center (MSC) or a Serving GPRS (General Packet Radio Service) Support Node (SGSN) entity of the serving network directly to a second location center, bypassing the first location center, wherein the second location center communicates with a client entity receiving the location estimate for the UE, and wherein the first and second location centers are associated with different networks.

36. The apparatus of claim 35, wherein the means for exchanging signaling between the UE and the serving network comprises
means for sending the request for location service from the UE to the serving network, and
means for sending an address of the second location center from the UE to the serving network, and wherein the location estimate for the UE is sent by the serving network directly to the second location center using the address sent by the UE.

37. The apparatus of claim 35, wherein the means for exchanging signaling between the UE and the serving network comprises
means for sending the location estimate for the UE to the serving network, and wherein the location processing is bypassed if the location estimate sent to the serving network is selected for use.

38. The apparatus of claim 35, further comprising:
means for sending a request to bypass the first location center; and means for receiving an indication of acceptance or rejection of the request to bypass the first location center.

39. A method of providing location services, comprising:
receiving from a serving network a location estimate for a user equipment (UE), wherein the serving network currently serves the UE, is distinct from a home network for the UE, and is associated with a first location center, wherein the location estimate is sent directly from a Mobile Switching Center (MSC) or a Serving GPRS (General Packet Radio Service) Support Node (SGSN) of the serving network to a second location center and bypasses the first location center, and wherein the first and second location centers are associated with different networks; and
sending the location estimate for the UE from the second location center to a client entity.

40. The method of claim 39, further comprising:
receiving a request to bypass the first location center; and
accepting or rejecting the request to bypass the first location center.

41. The method of claim 39, further comprising:
sending a request for UE location directly to the serving network and bypassing the first location center.

42. The method of claim 39, further comprising:
receiving from the client entity a request for periodic reporting of UE location to the client entity;
sending the request for periodic reporting toward the serving network; and
repeating the receiving from the serving network the location estimate for the UE and the sending the location estimate for the UE from the second location center to the client entity based on periodic location information indicative of when to send the location estimate for the UE to the client entity.

43. The method of claim 42, further comprising:
storing information for the request for periodic reporting; and
for each location reporting event indicated by the periodic location information,
retrieving the information stored for the request for periodic reporting, and
sending a request for location of the UE directly to the serving network and bypassing the first location center based on the retrieved information.

44. The method of claim 39, further comprising:
receiving a request sent by the UE for periodic reporting of UE location to the client entity;
sending the request for periodic reporting to the client entity; and
repeating the receiving from the serving network the location estimate for the UE and the sending the location estimate for the UE from the second location center to the client entity based on periodic location information indicative of when to send the location estimate for the UE to the client entity.

45. An apparatus comprising:
a processor operative to receive from a serving network a location estimate for a user equipment (UE), wherein the serving network currently serves the UE, is distinct from a home network for the UE, and is associated with a first location center, wherein the location estimate is sent directly from a Mobile Switching Center (MSC) or a Serving GPRS (General Packet Radio Service) Support Node (SGSN) of the serving network to a second location center and bypasses the first location center, and wherein the first and second location centers are associated with different networks; and
a communication unit operative to send the location estimate for the UE from the second location center to a client entity.

46. The apparatus of claim 45, wherein the processor is further operative to receive a request to bypass the first location center and to accept or reject the request to bypass the first location center.

47. The apparatus of claim 45, further comprising:
a memory unit operative to store information for a request for periodic reporting of UE location to the client entity, and
wherein the processor is further operative to determine location reporting events based on periodic location information indicative of when to send the location estimate for the UE to the client entity and, for each location reporting event, to retrieve the information stored for the request for periodic reporting and to send a request for UE location directly to the serving network and bypassing the first location center based on the retrieved information.

48. An apparatus comprising:
means for receiving from a serving network a location estimate for a user equipment (UE), wherein the serving network currently serves the UE, is distinct from a home network for the UE, and is associated with a first location center, wherein the location estimate is sent directly from a Mobile Switching Center (MSC) or a Serving GPRS (General Packet Radio Service) Support Node (SGSN) of the serving network to a second location center and bypasses the first location center, and wherein the first and second location centers are associated with different networks; and
means for sending the location estimate for the UE from the second location center to a client entity.

49. The apparatus of claim 48, further comprising:
means for receiving a request to bypass the first location center; and
means for accepting or rejecting the request to bypass the first location center.

50. The apparatus of claim 48, further comprising:
means for storing information for a request for periodic reporting of UE location to the client entity;
means for determining location reporting events based on periodic location information indicative of when to send the location estimate for the UE to the client entity;
means for retrieving the information stored for the request for periodic reporting for each location reporting event; and
means for sending a request for UE location directly to the serving network and bypassing the first location center based on the retrieved information.

51. A method of providing location services, comprising:
performing location processing with a user equipment (UE) to obtain a location estimate for the UE, the UE in communication with a first location center associated with a first network that is serving the UE;
determining if a location center short-circuit is allowed; and
if the location center short-circuit is allowed:
providing an address for a second location center to the first network; and
sending the location estimate directly from the first network to a second location center associated with a client entity for receiving the location estimate and a second network different from the first network, by directly addressing the second location center in a location services message that bypasses the first location center and other location centers.

52. The method of claim 51, wherein the second location center includes a requesting gateway mobile location center (R-GMLC).

53. The method of claim 51, wherein the location services message includes a Mobile Application Part (MAP) Subscriber Location Report message.

54. The method of claim 51, wherein determining if the location center short-circuit is allowed comprises determining that the location center short-circuit is allowed if the address of the second location center is received from the UE during the location processing.

55. A method of providing location services, comprising:
performing location processing with a user equipment (UE) to obtain a location estimate for the UE, wherein the UE is in communication with a serving network that is associated with a visited gateway mobile location center (V-GMLC) that is connected for communication with a requesting gateway mobile location center (R-GMLC) via a home gateway mobile location center (H-GMLC) associated with a home network of the UE; and sending the location estimate for the UE from a mobile services switching center (MSC) or a serving GPRS (general packet radio service) support node (SGSN) of the serving network directly to the R-GMLC while bypassing the V-GMLC and the H-GMLC, wherein the R-GMLC is associated with a client entity receiving the location estimate sent from the UE, wherein the V-GMLC and the R-GMLC are associated with different networks, and wherein the serving network associated with the MSC or the SGSN is distinct from a network associated with the R-GMLC.

* * * * *